US011799702B2

(12) United States Patent
Zhou et al.

(10) Patent No.: US 11,799,702 B2
(45) Date of Patent: Oct. 24, 2023

(54) TECHNIQUES FOR SELECTING PPDU FORMAT PARAMETERS

(71) Applicant: QUALCOMM Incorporated, San Diego, CA (US)

(72) Inventors: Yan Zhou, San Diego, CA (US); Bin Tian, San Diego, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/200,625

(22) Filed: Mar. 12, 2021

(65) Prior Publication Data

US 2021/0203531 A1    Jul. 1, 2021

Related U.S. Application Data

(62) Division of application No. 16/011,880, filed on Jun. 19, 2018, now Pat. No. 10,999,110.

(Continued)

(51) Int. Cl.
*H04L 27/26* (2006.01)
*H04L 5/00* (2006.01)
(Continued)

(52) U.S. Cl.
CPC ........ *H04L 27/2602* (2013.01); *H04L 1/0006* (2013.01); *H04L 5/0044* (2013.01);
(Continued)

(58) Field of Classification Search
CPC ............. H04L 27/2602; H04L 5/0044; H04L 27/2646; H04L 27/2605; H04L 27/2613; H04L 5/0048; H04L 1/0006; H04W 84/12
See application file for complete search history.

(56) References Cited

U.S. PATENT DOCUMENTS 8,665,906 B1    3/2014  Liu et al.
9,351,333 B1    5/2016  Zhang et al.
(Continued)

FOREIGN PATENT DOCUMENTS

EP         3316616 B1  *  4/2020  ........... H04L 5/0048
KR    20160096031 A   *  8/2016  ........... H04L 5/0007
(Continued)

OTHER PUBLICATIONS

International Search Report and Written Opinion—PCT/US2018/038464—ISA/EPO—dated Jan. 3, 2019.
(Continued)

*Primary Examiner* — Parth Patel
(74) *Attorney, Agent, or Firm* — Holland & Hart / Qualcomm

(57) ABSTRACT

Techniques are described herein that illustrate a feedback system to configure various format parameters of physical layer convergence procedure protocol data units (PPDUs) transmitted across a communication link. A receiving device may determine a Doppler shift or a delay spread of a signal received from a transmitting device. The receiving device may determine one or more format parameters for a future PPDU based on the Doppler shift or the delay spread. The receiving device may transmit an indication that includes the format parameters for the future PPDU to the transmitting device. The transmitting device may modify one or more format parameters of a PPDU based on the information in the indication. In some cases, the receiving device may indicate characteristics of mid-ambles, a type of PPDU, a guard interval, high efficiency long training field size for a future PPDU.

20 Claims, 20 Drawing Sheets

Related U.S. Application Data

(60) Provisional application No. 62/529,949, filed on Jul. 7, 2017.

(51) Int. Cl.
   *H04L 1/00* (2006.01)
   *H04W 84/12* (2009.01)

(52) U.S. Cl.
   CPC ........ *H04L 5/0048* (2013.01); *H04L 27/2605* (2013.01); *H04L 27/2613* (2013.01); *H04L 27/2646* (2013.01); *H04L 5/0007* (2013.01); *H04L 5/0055* (2013.01); *H04L 27/2603* (2021.01); *H04L 27/26132* (2021.01); *H04L 27/26136* (2021.01); *H04W 84/12* (2013.01)

(56) References Cited

U.S. PATENT DOCUMENTS

| | | | |
|---|---|---|---|
| 9,706,599 | B1 | 7/2017 | Zhang et al. |
| 9,794,092 | B1* | 10/2017 | Isautier ............. H04B 10/6161 |
| 11,470,488 | B1* | 10/2022 | Babaei .................. H04W 24/08 |
| 2004/0229650 | A1 | 11/2004 | Fitton et al. |
| 2008/0186868 | A1 | 8/2008 | Ma et al. |
| 2010/0040084 | A1 | 2/2010 | Seyedi-Esfahani et al. |
| 2012/0269142 | A1 | 10/2012 | Porat et al. |
| 2012/0322477 | A1 | 12/2012 | Kang et al. |
| 2012/0327871 | A1 | 12/2012 | Ghosh et al. |
| 2013/0028346 | A1* | 1/2013 | Hottinen ............... H04W 16/14 375/285 |
| 2013/0121244 | A1 | 5/2013 | Vermani et al. |
| 2013/0279379 | A1 | 10/2013 | Yang et al. |
| 2014/0010324 | A1 | 1/2014 | Kenney et al. |
| 2014/0211775 | A1* | 7/2014 | Sampath ........... H04L 27/26136 370/338 |
| 2014/0219110 | A1 | 8/2014 | Du et al. |
| 2015/0334656 | A1 | 11/2015 | Ji et al. |
| 2016/0013951 | A1 | 1/2016 | Wang |
| 2016/0044676 | A1 | 2/2016 | Choi et al. |
| 2016/0057656 | A1* | 2/2016 | HomChaudhuri .. H04L 25/0216 370/235 |
| 2016/0119452 | A1* | 4/2016 | Lee ........................ H04L 69/10 370/338 |
| 2016/0165424 | A1 | 6/2016 | El-Dinary |
| 2016/0192307 | A1 | 6/2016 | Kim et al. |
| 2016/0329989 | A1 | 11/2016 | Li et al. |
| 2017/0264413 | A1 | 9/2017 | Azizi et al. |
| 2017/0272138 | A1 | 9/2017 | Chun et al. |
| 2017/0288748 | A1 | 10/2017 | Lou et al. |
| 2017/0347340 | A1 | 11/2017 | Haley et al. |
| 2018/0045821 | A1 | 2/2018 | Lee et al. |
| 2018/0103487 | A1 | 4/2018 | Asterjadhi et al. |
| 2018/0131469 | A1 | 5/2018 | Liu et al. |
| 2018/0198654 | A1* | 7/2018 | Zhang ................... H04L 69/324 |
| 2018/0278308 | A1 | 9/2018 | Jin et al. |
| 2018/0302939 | A1 | 10/2018 | Yankevich et al. |
| 2018/0309605 | A1 | 10/2018 | Liu et al. |
| 2018/0359066 | A1 | 12/2018 | Mu et al. |
| 2018/0376507 | A1 | 12/2018 | Kwon et al. |
| 2019/0013978 | A1* | 1/2019 | Zhou ................... H04L 27/2613 |
| 2019/0364525 | A1* | 11/2019 | Yu ............................ H04L 27/26 |
| 2020/0228634 | A1* | 7/2020 | Noh ................. H04L 27/26132 |
| 2020/0287763 | A1* | 9/2020 | Bhanage ............. H04L 27/2607 |
| 2021/0203531 | A1* | 7/2021 | Zhou ................... H04L 27/2602 |

FOREIGN PATENT DOCUMENTS

| | | | |
|---|---|---|---|
| WO | WO-2015171499 A2 | 11/2015 | |
| WO | WO-2016065169 A1 * | 4/2016 | .......... H04B 7/0452 |
| WO | WO-2018084900 A1 | 5/2018 | |

OTHER PUBLICATIONS

International Preliminary Report on Patentability—PCT/US2018/038464, The International Bureau of WIPO—Geneva, Switzerland, dated Jan. 16, 2020.

Kome Oteri (Interdigital): "Performance of 1x, 2x, and 4x HE-LTF; 11-15-0569-01-00ax-performance-of-1x-2x-and-4x-he-ltf", IEEE Draft; 11-15-0569-01-00AX-PERFORMANCE-OF-1X-2X-AND-4X-HE-LTF, IEEE-SA Mentor, Piscataway, NJ USA, vol. 802.11ax, No. 1, May 11, 2015, pp. 1-20, XP068094425, [retrieved on May 11, 2015].

Partial International Search Report—PCT/US2018/038464—ISA/EPO—dated Sep. 25, 2018.

Ron Porat (Broadcom): "CP and LTF Options and Signaling," IEEE Draft; 11-16-0654-00-00AX-CP-AND-SIGNALING, IEEE-SA Mentor, Piscataway, NJ, USA, vol. 802.11ax, May 16, 2016, pp. 1-17, XP068119524, Retrieved from the Internet: URL: https://mentor.ieee.org/802.11/dcn/16/11-16-0654-00-00ax-cp-and-ltf-options-and-signaling.pptx [retrieved on May 16, 2016].

* cited by examiner

TECHNIQUES FOR SELECTING PPDU FORMAT PARAMETERS

CROSS REFERENCE

The present application for patent is a Division of U.S. patent application Ser. No. 16/011,880 by ZHOU, et al., entitled "TECHNIQUES FOR SELECTING PPDU FORMAT PARAMETERS," filed Jun. 19, 2018, which claims priority to U.S. Provisional Patent Application No. 62/529,949 by ZHOU, et al., entitled "TECHNIQUES FOR SELECTING PPDU FORMAT PARAMETERS," filed Jul. 7, 2017, each of which is assigned to the assignee hereof, and each of which is expressly incorporated herein by reference in its entirety.

TECHNICAL FIELD

The following relates generally to wireless communication, and more specifically to techniques for selecting physical layer convergence procedure (PLCP) protocol data unit (PPDU) format parameters.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and power). A wireless network, for example a WLAN, such as a Wi-Fi (in other words, Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

Some wireless communication systems include PPDUs in signals transmitted to other devices. Various parameters associated with a PPDU may be configured before transmitting. The use of different PPDU configurations in different situations may improve aspects of a communication link between two devices, but using different PPDU configurations in different situations presents distinct challenges.

SUMMARY

The systems, methods and devices of this disclosure each have several innovative aspects, no single one of which is solely responsible for the desirable attributes disclosed herein. The described techniques relate to methods, systems, devices, or apparatuses that support techniques for selecting physical layer convergence procedure (PLCP) protocol data unit (PPDU) format parameters. Generally, the described techniques provide for a feedback system to configure various format parameters of PPDUs transmitted across a communication link. A receiving device may identify one or more channel conditions, interference conditions, and/or decoding results of a signal received from a transmitting device. The receiving device may determine one or more format parameters for a future PPDU to be transmitted to the receiving device. The receiving device may transmit an indication that includes the format parameters for a future PPDU to the transmitting device. The transmitting device may modify one or more format parameters of a PPDU based in part on the information in the indication. In some cases, a receiving device may indicate characteristics of mid-ambles for a future PPDU based on identifying a Doppler shift in a signal. In some cases, a receiving device may indicate a type of PPDU to be used based on identifying one of a plurality of conditions. In some cases, a receiving device may indicate a guard interval duration or a high efficiency long training field (HE-LTF) size based on identifying a delay spread in a signal.

One innovative aspect of the subject matter described in this disclosure can be implemented in a method for wireless communication, including identifying a channel condition, an interference condition, or a reception result associated with a signal received from a transmitter, determining a format parameter for a PPDU based at least in part on the channel condition, the interference condition, or the reception result, and transmitting an indication of the format parameter of the PPDU to the transmitter.

Another innovative aspect of the subject matter described in this disclosure can be implemented in an apparatus. The apparatus may include means for identifying a channel condition, an interference condition, or a reception result associated with a signal received from a transmitter, means for determining a format parameter for a PPDU based at least in part on the channel condition, the interference condition, or the reception result, and means for transmitting an indication of the format parameter of the PPDU to the transmitter.

Another innovative aspect of the subject matter described in this disclosure can be implemented in an apparatus including a processor, memory in electronic communication with the processor, and instructions stored in the memory. The instructions may be operable to cause the processor to identify a channel condition, an interference condition, or a reception result associated with a signal received from a transmitter, determine a format parameter for a PPDU based at least in part on the channel condition, the interference condition, or the reception result, and transmit an indication of the format parameter of the PPDU to the transmitter.

Another innovative aspect of the subject matter described in this disclosure can be implemented in a non-transitory computer readable medium for wireless communication. The non-transitory computer-readable medium may include instructions operable to cause a processor to identify a channel condition, an interference condition, or a reception result associated with a signal received from a transmitter, determine a format parameter for a PPDU based at least in part on the channel condition, the interference condition, or the reception result, and transmit an indication of the format parameter of the PPDU to the transmitter.

In some implementations of the method, apparatus, and non-transitory computer-readable medium described above, the format parameter indicates whether the PPDU is to include a mid-amble.

Some implementations of the method, apparatus, and non-transitory computer-readable medium described above may further include processes, features, means, or instructions for determining a Doppler shift of the signal based at least in part on the channel condition, the interference condition, or the reception result. Some implementations of the method, apparatus, and non-transitory computer-readable medium described above may further include processes, features, means, or instructions for determining whether the Doppler shift satisfies a threshold, where determining the format parameter that indicates whether the PPDU is to include the mid-amble may be based at least in part on determining that the Doppler shift satisfies the threshold.

In some implementations of the method, apparatus, and non-transitory computer-readable medium described above, the indication includes a Doppler mode field that indicates whether the mid-amble is to be included in the PPDU.

Some implementations of the method, apparatus, and non-transitory computer-readable medium described above may further include processes, features, means, or instructions for determining a mid-amble size based at least in part on the channel condition, the interference condition, or the reception result, where the indication includes a size field that indicates the mid-amble size.

Some implementations of the method, apparatus, and non-transitory computer-readable medium described above may further include processes, features, means, or instructions for determining an offset of the mid-amble from a beginning of a preamble of the PPDU based at least in part on the channel condition, the interference condition, or the reception result, where the indication includes an offset field that indicates the offset.

Some implementations of the method, apparatus, and non-transitory computer-readable medium described above may further include processes, features, means, or instructions for determining a mid-amble interval between a first mid-amble and a second mid-amble in the PPDU based at least in part on the channel condition, the interference condition, or the reception result, where the indication includes an interval field that indicates the mid-amble interval.

Some implementations of the method, apparatus, and non-transitory computer-readable medium described above may further include processes, features, means, or instructions for determining a format of the mid-amble based at least in part on the channel condition, the interference condition, or the reception result, where the indication includes a mid-amble format field indicating the format of the mid-amble.

In some implementations of the method, apparatus, and non-transitory computer-readable medium described above, the format of the mid-amble indicates whether the mid-amble includes a high efficiency short training field (HE-STF), a HE-LTF, a size of the HE-LTF in the mid-amble, a guard interval duration, or a combination thereof.

In some implementations of the method, apparatus, and non-transitory computer-readable medium described above, the format parameter indicates that the PPDU is to include a second mid-amble different from the mid-amble, the second mid-amble being spaced apart from the mid-amble based at least in part on a mid-amble interval.

In some implementations of the method, apparatus, and non-transitory computer-readable medium described above, the format parameter indicates one or both of a guard interval of the PPDU or a HE-LTF size.

Some implementations of the method, apparatus, and non-transitory computer-readable medium described above may further include processes, features, means, or instructions for determining a delay spread of the signal based at least in part on the channel condition, the interference condition, or the reception result. Some implementations of the method, apparatus, and non-transitory computer-readable medium described above may further include processes, features, means, or instructions for determining whether the delay spread satisfies a threshold, where determining one or both of the guard interval or the HE-LTF size may be based at least in part on determining that the delay spread satisfies the threshold.

In some implementations of the method, apparatus, and non-transitory computer-readable medium described above, the indication includes a guard interval field that indicates a duration of the guard interval.

In some implementations of the method, apparatus, and non-transitory computer-readable medium described above, the indication includes a size field that indicates a symbol size of the HE-LTF.

Some implementations of the method, apparatus, and non-transitory computer-readable medium described above may further include processes, features, means, or instructions for determining a combined index that includes both the guard interval and the HE-LTF size, where the indication includes the combined index.

Some implementations of the method, apparatus, and non-transitory computer-readable medium described above may further include processes, features, means, or instructions for determining a PPDU format based at least in part on determining one or both of the guard interval or the HE-LTF size, where the indication includes a format field indicating the determined PPDU format.

In some implementations of the method, apparatus, and non-transitory computer-readable medium described above, the format parameter indicates whether the PPDU may be an extended range (ER) PPDU.

Some implementations of the method, apparatus, and non-transitory computer-readable medium described above may further include processes, features, means, or instructions for determining that a position of a receiver relative to the transmitter satisfies a threshold based at least in part on the channel condition, the interference condition, or the reception result, where determining the format parameter that indicates whether the PPDU may be the ER PPDU may be based at least in part on determining that the position satisfies the threshold.

Some implementations of the method, apparatus, and non-transitory computer-readable medium described above may further include processes, features, means, or instructions for determining that a path loss of a communication link between a receiver and the transmitter satisfies a threshold based at least in part on the channel condition, the interference condition, or the reception result, where determining the format parameter that indicates whether the PPDU may be the ER PPDU may be based at least in part on determining that the path loss satisfies the threshold.

Some implementations of the method, apparatus, and non-transitory computer-readable medium described above may further include processes, features, means, or instructions for determining that a signal strength of a communication link between a receiver and the transmitter satisfies a threshold based at least in part on the channel condition, the interference condition, or the reception result, where determining the format parameter that indicates whether the PPDU may be the ER PPDU may be based at least in part on determining that the signal strength satisfies the threshold.

Some implementations of the method, apparatus, and non-transitory computer-readable medium described above may further include processes, features, means, or instructions for determining a bandwidth of the ER PPDU based at least in part on the channel condition, the interference condition, or the reception result, where the indication includes a bandwidth field that indicates the bandwidth.

Some implementations of the method, apparatus, and non-transitory computer-readable medium described above may further include processes, features, means, or instructions for determining that a decoding failure rate for high efficiency (HE) single user (SU) PPDUs received from the transmitter satisfies a threshold, where transmitting the indication that enables the ER PPDU may be based at least in part on determining that the decoding failure rate satisfies the threshold.

Some implementations of the method, apparatus, and non-transitory computer-readable medium described above may further include processes, features, means, or instructions for determining that a decoding failure rate for a first bandwidth satisfies a threshold, where the indication indicates that a second bandwidth for the ER PPDU less than the first bandwidth based at least in part on determining that the decoding failure rate satisfies the threshold.

Some implementations of the method, apparatus, and non-transitory computer-readable medium described above may further include processes, features, means, or instructions for receiving a request from the transmitter to provide feedback to the transmitter about PPDU performance, where determining the format parameter may be based at least in part on receiving the request.

In some implementations of the method, apparatus, and non-transitory computer-readable medium described above, the format parameter may be determined and the indication may be transmitted autonomously, independent of receiving a request from the transmitter.

Some implementations of the method, apparatus, and non-transitory computer-readable medium described above may further include processes, features, means, or instructions for generating a high efficiency link adaptation (HLA) control message that includes the indication, where transmitting the indication includes transmitting the HLA control message.

Some implementations of the method, apparatus, and non-transitory computer-readable medium described above may further include processes, features, means, or instructions for generating a high efficiency (HE) SIG-A field that includes the indication, where transmitting the indication includes transmitting the HE-SIG-A field.

In some implementations of the method, apparatus, and non-transitory computer-readable medium described above, the PPDU may be a high efficiency PPDU, a HE SU PPDU, a HE extended range (ER) SU PPDU, a HE multi user (MU) PPDU, or a HE trigger based (TB) PPDU.

Another innovative aspect of the subject matter described in this disclosure can be implemented in a method for wireless communication, including determining a Doppler shift of a signal received from a transmitter, determining a format parameter for a PLCP PPDU based on the Doppler shift of the signal, and transmitting an indication of the format parameter of the PPDU to the transmitter.

Another innovative aspect of the subject matter described in this disclosure can be implemented in an apparatus, including a processor, memory in electronic communication with the processor, and instructions stored in the memory. The instructions may be executable by the processor to cause the apparatus to determine a Doppler shift of a signal received from a transmitter, determine a format parameter for a PLCP PPDU based on the Doppler shift of the signal, and transmit an indication of the format parameter of the PPDU to the transmitter.

Another innovative aspect of the subject matter described in this disclosure can be implemented in an apparatus, including means for determining a Doppler shift of a signal received from a transmitter, determining a format parameter for a PLCP PPDU based on the Doppler shift of the signal, and transmitting an indication of the format parameter of the PPDU to the transmitter.

Another innovative aspect of the subject matter described in this disclosure can be implemented in a non-transitory computer-readable medium storing code for wireless communication, including instructions executable by a processor to determine a Doppler shift of a signal received from a transmitter, determine a format parameter for a PLCP PPDU based on the Doppler shift of the signal, and transmit an indication of the format parameter of the PPDU to the transmitter.

Some implementations of the method, apparatuses, and non-transitory computer-readable medium described herein may further include operations, features, means, or instructions for identifying a channel condition, an interference condition, or a reception result associated with the signal received from the transmitter, where determining the Doppler shift may be based on the channel condition, the interference condition, or the reception result.

Some implementations of the method, apparatuses, and non-transitory computer-readable medium described herein may further include operations, features, means, or instructions for determining whether the Doppler shift satisfies a threshold, where determining the format parameter that indicates whether the PPDU may be to include the mid-amble may be based on determining that the Doppler shift satisfies the threshold.

In some implementations of the method, apparatuses, and non-transitory computer-readable medium described herein, the format parameter indicates whether the PPDU may be to include a mid-amble.

In some implementations of the method, apparatuses, and non-transitory computer-readable medium described herein, the indication includes a Doppler mode field that indicates whether the mid-amble should be included in the PPDU.

Some implementations of the method, apparatuses, and non-transitory computer-readable medium described herein may further include operations, features, means, or instructions for determining a mid-amble size based on a channel condition, an interference condition, or a reception result associated with the signal received from the transmitter, where the indication includes a size field that indicates the mid-amble size.

Some implementations of the method, apparatuses, and non-transitory computer-readable medium described herein may further include operations, features, means, or instructions for determining an offset of the mid-amble from a beginning of a preamble of the PPDU based on a channel condition, an interference condition, or a reception result associated with the signal received from the transmitter, where the indication includes an offset field that indicates the offset.

Some implementations of the method, apparatuses, and non-transitory computer-readable medium described herein may further include operations, features, means, or instructions for determining a mid-amble interval between a first mid-amble and a second mid-amble in the PPDU based on a channel condition, an interference condition, or a reception result associated with the signal received from the transmitter, where the indication includes an interval field that indicates the mid-amble interval.

Some implementations s of the method, apparatuses, and non-transitory computer-readable medium described herein may further include operations, features, means, or instructions for determining a format of the mid-amble based on a channel condition, an interference condition, or a reception result associated with the signal received from the transmitter, where the indication includes a mid-amble format field indicating the format of the mid-amble.

Another innovative aspect of the subject matter described in this disclosure can be implemented in a method for wireless communication, including determining a delay spread of a signal received from a transmitter, determining a format parameter for a PLCP PPDU based on the delay spread of the signal, and transmitting an indication of the format parameter of the PPDU to the transmitter.

Another innovative aspect of the subject matter described in this disclosure can be implemented in an apparatus, including a processor, memory in electronic communication with the processor, and instructions stored in the memory. The instructions may be executable by the processor to cause the apparatus to determine a delay spread of a signal received from a transmitter, determine a format parameter for a PLCP PPDU based on the delay spread of the signal, and transmit an indication of the format parameter of the PPDU to the transmitter.

Another innovative aspect of the subject matter described in this disclosure can be implemented in an apparatus, including means for determining a delay spread of a signal received from a transmitter, determining a format parameter for a PLCP PPDU based on the delay spread of the signal, and transmitting an indication of the format parameter of the PPDU to the transmitter.

Another innovative aspect of the subject matter described in this disclosure can be implemented in a non-transitory computer-readable medium storing code for wireless communication. The code may include instructions executable by a processor to determine a delay spread of a signal received from a transmitter, determine a format parameter for a PLCP PPDU based on the delay spread of the signal, and transmit an indication of the format parameter of the PPDU to the transmitter.

Some implementations of the method, apparatuses, and non-transitory computer-readable medium described herein may further include operations, features, means, or instructions for identifying a channel condition, an interference condition, or a reception result associated with the signal received from the transmitter, where determining the delay spread may be based on the channel condition, the interference condition, or the reception result.

In some implementations of the method, apparatuses, and non-transitory computer-readable medium described herein, the format parameter indicates one or both of a guard interval of the PPDU or a HE-LTF size.

Some implementations of the method, apparatuses, and non-transitory computer-readable medium described herein may further include operations, features, means, or instructions for determining whether the delay spread satisfies a threshold, where determining one or both of the guard interval or the HE-LTF size may be based on determining that the delay spread satisfies the threshold.

In some implementations of the method, apparatuses, and non-transitory computer-readable medium described herein, the indication includes a guard interval field that indicates a duration of the guard interval.

In some implementations of the method, apparatuses, and non-transitory computer-readable medium described herein, the indication includes a size field that indicates a symbol size of an HE-LTF.

In some implementations of the method, apparatuses, and non-transitory computer-readable medium described herein, the indication includes the combined index.

Some implementations of the method, apparatuses, and non-transitory computer-readable medium described herein may further include operations, features, means, or instructions for determining a PPDU format based on determining one or both of the guard interval or the HE-LTF size, where the indication includes a format field indicating the determined PPDU format.

In some implementations of the method, apparatuses, and non-transitory computer-readable medium described herein, the format parameter of the PPDU indicates whether a first mid-amble includes a HE-STF, a HE-LTF, a size of the HE-LTF in the first mid-amble, a guard interval duration, or a combination thereof.

In some implementations of the method, apparatuses, and non-transitory computer-readable medium described herein, the format parameter indicates that the PPDU may be to include the first mid-amble, a second mid-amble different from the first mid-amble, the second mid-amble being spaced apart from the first mid-amble based on a mid-amble interval.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
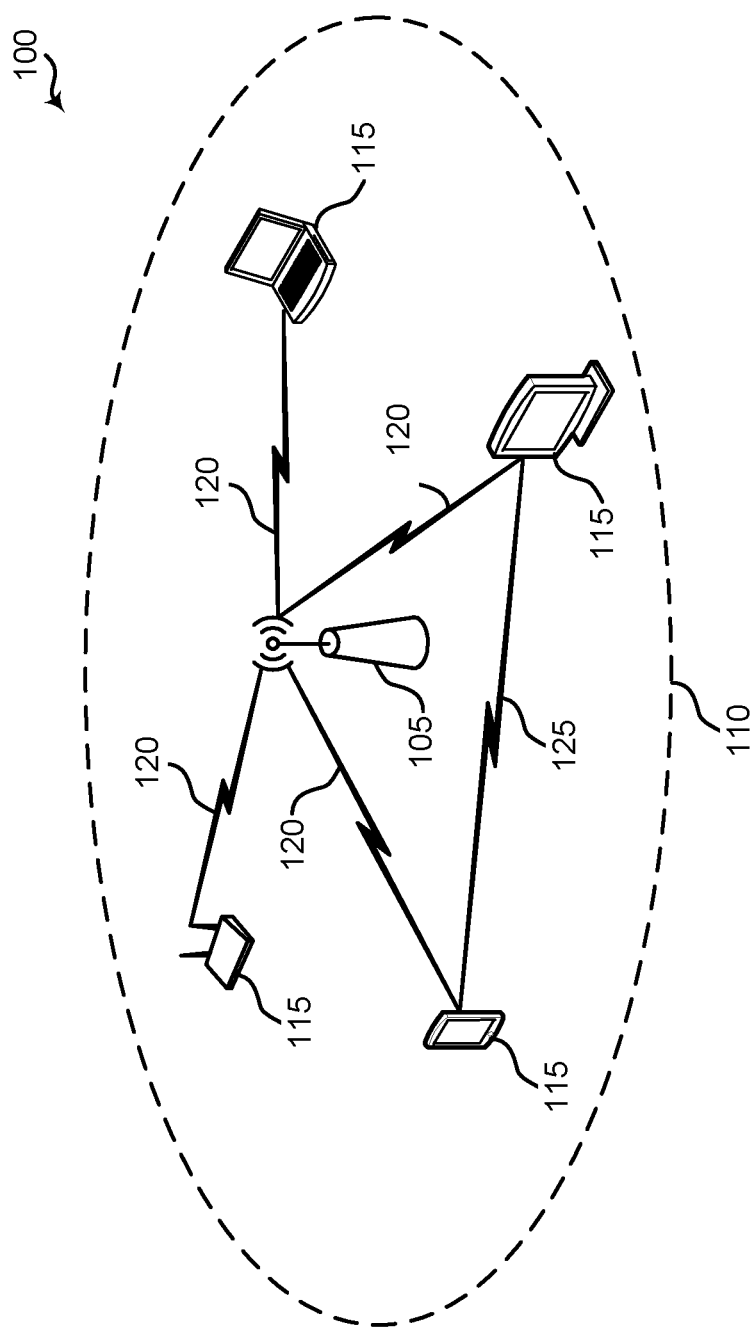
FIG. 1 shows an example wireless communication system that supports techniques for selecting physical layer convergence procedure (PLCP) protocol data unit (PPDU) format parameters according to some implementations.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the IEEE 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communication systems, various format parameters of a physical layer convergence procedure (PLCP) protocol data unit (PPDU) may be configured by a transmitting device prior to transmission. These format parameters of the PPDU may affect signal quality, decodability, and channel conditions (among other aspects) of a signal transmitted to a receiving device. If the appropriate format parameters are used in the appropriate situation, the quality of a communication link and resulting communication between two devices may be raised. The transmitting device, however, in some cases may not be able to determine all of the pertinent information to select the most appropriate set of format parameters for a PPDU. In some cases, a receiving device may be configured to provide feedback or other information to the transmitting device to aid in format parameter selection for PPDUs.

Techniques described herein relate to a feedback system to configure various format parameters of PPDUs transmitted across one or more communication links. A first device (for example, a receiving device) may identify one or more channel conditions, interference conditions, and/or decoding results of a signal communicated from a second device (for example, a transmitting device). The first device may determine one or more format parameters for a future PPDU to be transmitted to the first device. The first device may transmit an indication that includes the format parameters or information related to the format parameters for a future PPDU to the second device. The second device may modify one or more format parameters of a PPDU based on the information in the indication. In some cases, a first device may indicate characteristics of mid-ambles for a future PPDU based on identifying a Doppler shift in a signal. In some cases, a first device may indicate a type of PPDU to be used based on identifying one of a plurality of conditions. In some cases, a first device may indicate a guard interval duration or a high efficiency long training field (HE-LTF) size based on identifying a delay spread in a signal.

Aspects of the disclosure are initially described in the context of a wireless communications system. Aspects of the disclosure also are described in the context of communication schemes and message structures. Aspects of the disclosure are further illustrated by and described with reference to apparatus diagrams, system diagrams, and flowcharts that relate to techniques for selecting PPDU format parameters FIG. 1 illustrates a wireless communication system 100 (also known as a wireless local area network (WLAN) or a Wi-Fi network) configured in accordance with various aspects of the present disclosure. The wireless communication system 100 may include an AP 105 and multiple associated STAs 115, which may represent devices such as mobile stations, personal digital assistant (PDAs), other handheld devices, netbooks, notebook computers, tablet computers, laptops, display devices (for example, TVs, computer monitors), printers, etc. The AP 105 and the associated STAs 115 may represent a BSS or an extended service set (ESS). The various STAs 115 in the network are able to communicate with one another through the AP 105. Also shown is a coverage area 110 of the AP 105, which may represent a basic service area of the wireless communication system 100. An extended network station (not shown) associated with the wireless communication system 100 may be connected to a wired or wireless distribution system that may allow multiple APs 105 to be connected in an ESS.

A receiving device (for example, a STA 115) may provide feedback to a transmitting device (for example, AP 105) regarding format parameters for a PPDU. A transmitting device may be operable to configure PPDUs to improve a quality of a communication link between the transmitting device and the receiving device. The transmitting device may select the format parameters PPDU in accordance with changes in the quality of the communication link if the transmitting device has information from the receiving device regarding channel conditions, interference conditions, and/or decoding results, among other information associated with the communication link.

Although not shown in FIG. 1, a STA 115 may be located in the intersection of more than one coverage area 110 and may associate with more than one AP 105. A single AP 105 and an associated set of STAs 115 may be referred to as a basic service set (BSS), and may communicate via wireless infrastructure link 120. An ESS is a set of connected BSSs. A distribution system (not shown) may be used to connect APs 105 in an ESS. In some cases, the coverage area 110 of an AP 105 may be divided into sectors (also not shown). The wireless communication system 100 may include APs 105 of different types (for example, metropolitan area, home network), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, or the like. In other implementations, peer-to-peer connections or ad hoc networks may be implemented within the wireless communication system 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (for example, carrier sense multiple access/collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-sent (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
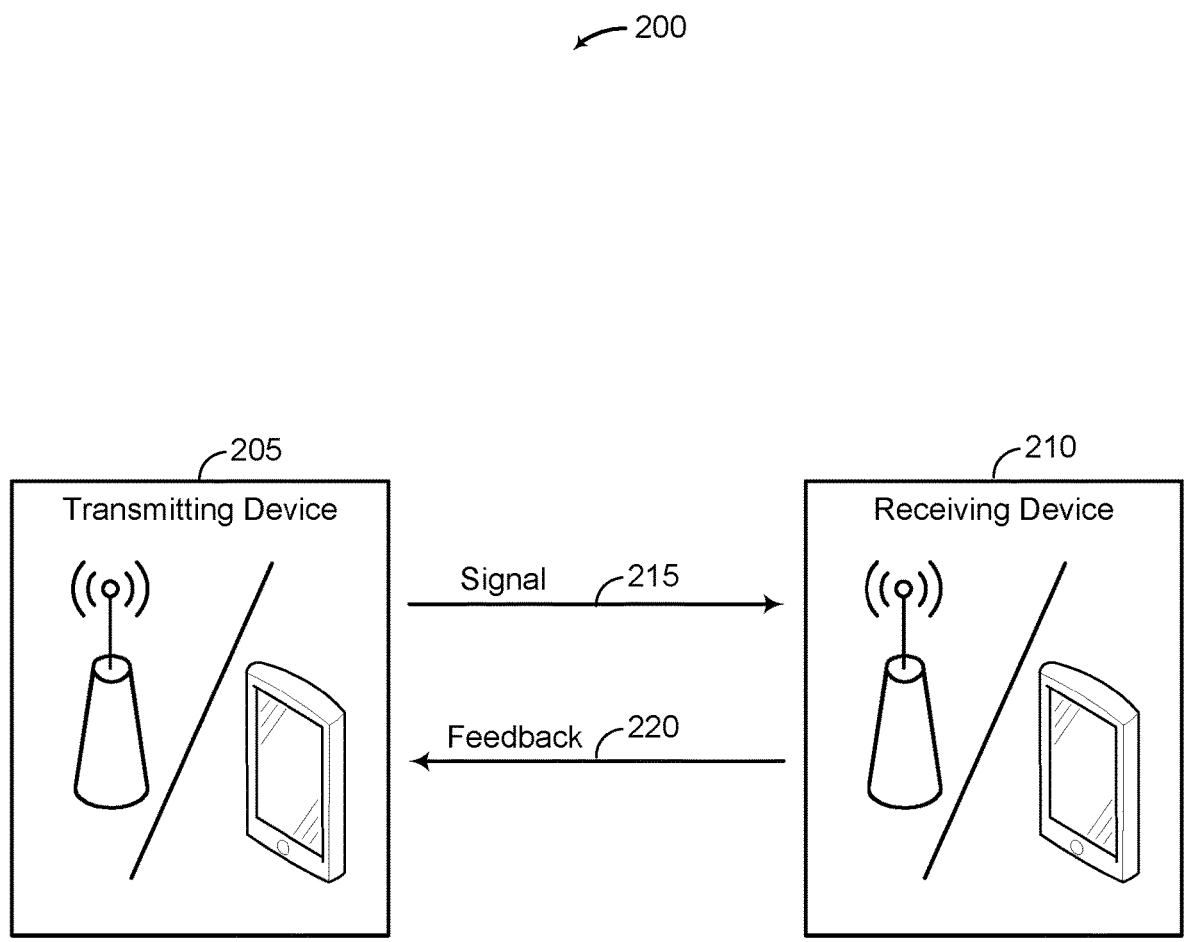
FIG. 2 shows an example wireless communication system that supports techniques for selecting PPDU format parameters according to some implementations.

FIG. 2 shows an example wireless communication system 200 that supports techniques for selecting PPDU format parameters according to some implementations. In some examples, the wireless communication system 200 may implement aspects of wireless communication system 100. The wireless communication system 200 illustrates communications between a first device (for example, receiving device 210) and a second device (for example, transmitting device 205). The transmitting device 205 may be an example of APs 105 or STAs 115 described with reference to FIG. 1. The receiving device 210 may be an example of APs 105 or STAs 115 described with reference to FIG. 1.

The wireless communication system 200 illustrates a feedback system to configure various format parameters of PPDUs transmitted across a communication link. The transmitting device 205 may transmit a signal 215 to the receiving device 210 that includes one or more PPDUs. To improve link performance, the transmitting device 205 may control a plurality of format parameters of the PPDUs of the signal 215 transmitted by the transmitting device 205. The receiving device 210, however, may be better able to identify the channel conditions, the interference conditions, and/or the decoding results that may be used to modify the format parameters of the PPDUs than the transmitting device 205. As such, the receiving device 210 may be configured to provide information, such as feedback 220, to the transmitting device 205. In some cases, the channel quality, signal strength, or other channel conditions may improve if the appropriate PPDU format parameters are used in the appropriate situation.

The feedback 220 may be configured to provide information related to configuring subsequent PPDUs for transmission to the receiving device 210. Existing feedback information provided by a receiving device 210 to a transmitting device 205 may not provide enough information to properly configure the format parameters of the PPDUs. For example, a reverse link block acknowledgement (ACK) may not provide the transmitting device 205 enough information to fully configure the format parameters of the PPDUs. In some examples, a time duration of the reverse link block ACK may be short (for example, 70 μs), and thus, may not be able to see enough channel variations to detect Doppler shift. In other examples, broadcast or multicast traffic may not support block ACK in a reverse link, leaving the transmitting device 205 without the ability to directly measure delay spread at the receiving device 210. In some examples, due to a low transit power in a reverse link, the reverse link block ACK may have fewer pilot signals (for example, reference signals or the like) and/or signal to noise ratio (SNR) than the forward link data PPDU.

In some cases, the feedback 220 may be configured to indicate the identified channel conditions, the interference conditions, the decoding results, or combinations thereof. In some examples, the receiving device 210 may determine one or more recommended format parameters for the PPDUs, and the feedback 220 may be configured to indicate the one or more recommended format parameters. In some cases, the feedback 220 may be configured to use new or existing management frames and HE control fields, for example, a high efficiency link adaptation (HLA) control field or an operating mode indication (OMI) control field.

In some cases, the feedback 220 may indicate a type of PPDU that may be transmitted to the receiving device 210. For example, the feedback 220 may indicate that subsequent PPDUs transmitted to the receiving device 210 may be examples of a HE PPDU, a HE single-user (SU) PPDU, a HE multi-user (MU) PPDU, a HE extended range (ER) PPDU, a HE ER SU PPDU, a HE ER MU PPDU, or a HE trigger based (TB) PPDU.

In some cases, the feedback 220 may indicate whether the PPDU is to include a mid-amble. A PPDU (for example, HE PPDU) may include one or more mid-ambles to improve tracking of channel variation, for example, in an outdoor mobility scenario.

In some cases, the feedback 220 may indicate a guard interval (GI), or a size of a HE-LTF, or both for the PPDU. The GI and/or the HE-LTF size may be configured to cope with large delay spread in the signal 215, for example, in an outdoor mobility scenario. The GIs and/or the HE-LTF sizes may be configured differently for each type of PPDU.

Figure 3:
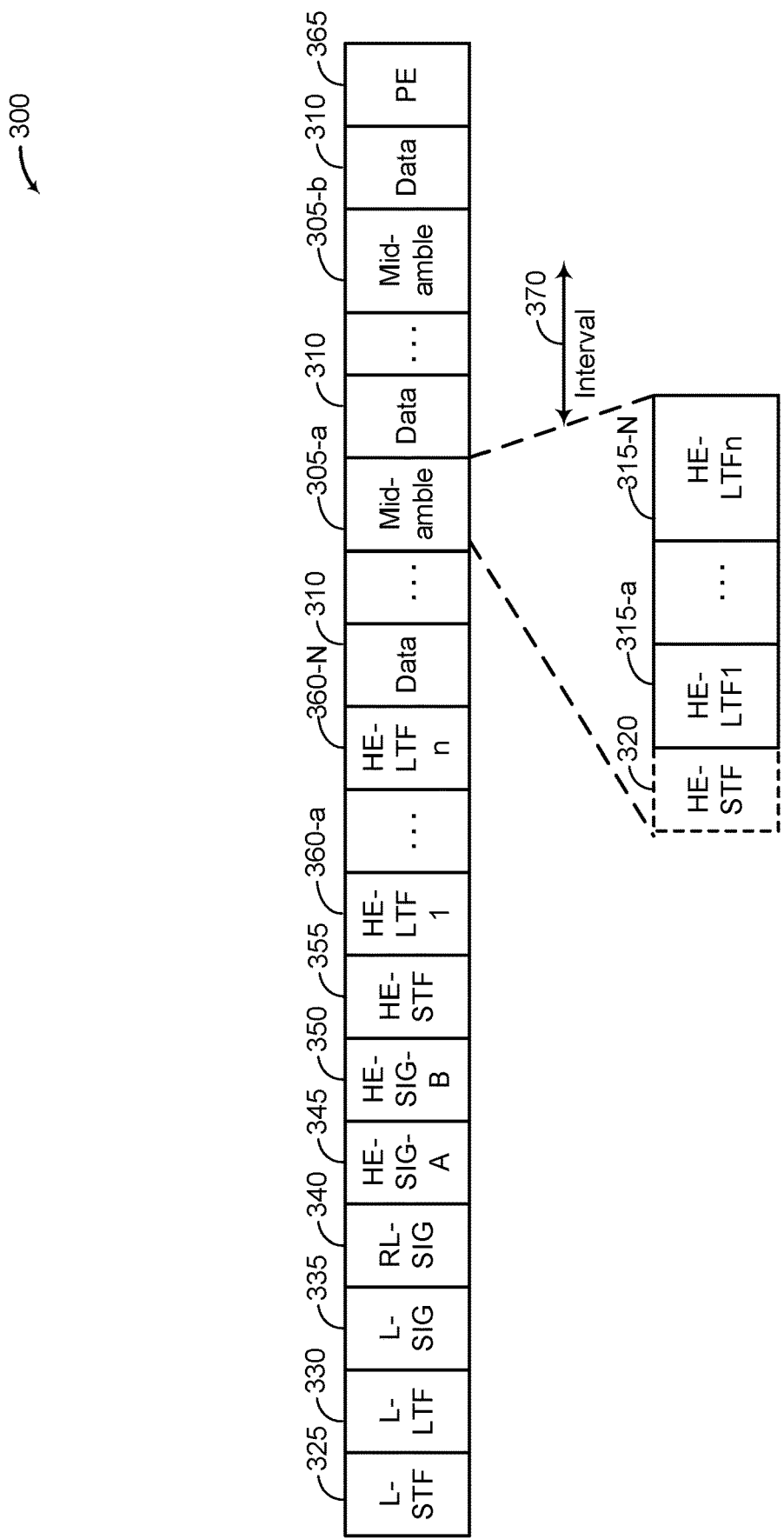
FIG. 3 shows an example message structure that supports techniques for selecting PPDU format parameters according to some implementations.

FIG. 3 shows an example message structure (for example, a PPDU) 300 that supports techniques for selecting PPDU format parameters according to some implementations. In some examples, the PPDU 300 may implement aspects of wireless communication systems 100 or 200.

An example of a format parameter for the PPDU 300 may include one or more mid-ambles. In some situations, channel conditions may vary over a single transmission, especially if the transmission is a long transmission. If training fields are merely positioned at the beginning of a transmission (for example, in a preamble), the channel may vary before the transmission is complete and the receiving device may not be able to identify the variation.

In some examples, a PPDU 300 may include one or more mid-ambles 305 interspersed with data symbols 310 after a preamble of the PPDU 300. A mid-amble 305 may include one or more HE-LTFs 315. The number of HE-LTFs 315 in the mid-amble 305 may be determined as a function of a space-time stream number. The mid-amble 305 may optionally include a high efficiency short training field (HE-STF) 320. The HE-STF 320 of the mid-amble 305 may be short HE-STF field or a full HE-STF field. The PPDU 300 may also include one or more legacy short training fields (L-STF) 325, one or more legacy long training fields (L-LTF) 330, one or more legacy signal (L-SIG) fields 335, one or more repeated legacy signal (RL-SIG) fields 340, one or more high efficiency signal A (HE-SIG-A) fields 345, one or more high efficiency signal B (HE-SIG-B) fields 350, one or more HE-STFs 355, one or more HE-LTFs 360, and/or one or more packet extension (PE) fields 365

A number of other characteristics of the mid-amble 305 may affect the configuration of the PPDU 300. In some examples, an example of a mid-amble characteristic may include that a mid-amble interval 370 may indicate a number of data symbols 310 between two mid-ambles. In some examples, an example of a mid-amble characteristic may include a mid-amble offset that may indicate a distance between a first mid-amble 305-a of the PPDU 300 and a start of the HE training fields in the preamble (for example, HE-STFs 355 and/or HE-LTFs 360). In some examples, an example of a mid-amble characteristic may include that a Doppler bit may indicate whether the PPDU 300 includes one or mid-ambles 305. The Doppler bit may be included in a HE-SIG-A field 345 of the PPDU 300. In some examples, an example of a mid-amble characteristic may include that a short training field (STF) parameter may indicate whether the mid-amble includes a short HE-STF, a full HE-STF, or no HE-STF.

In some examples, an example of a mid-amble characteristic may include that a mid-amble size may indicate a number of HE-LTFs 315 in the mid-amble 305. In some examples, an example of a mid-amble characteristic may include that a GI duration may indicate a guard interval associated with the mid-amble 305. In some examples, an example of a mid-amble characteristic may include that a mid-amble format index may indicate any combination of the characteristics discussed above.

Figure 4:
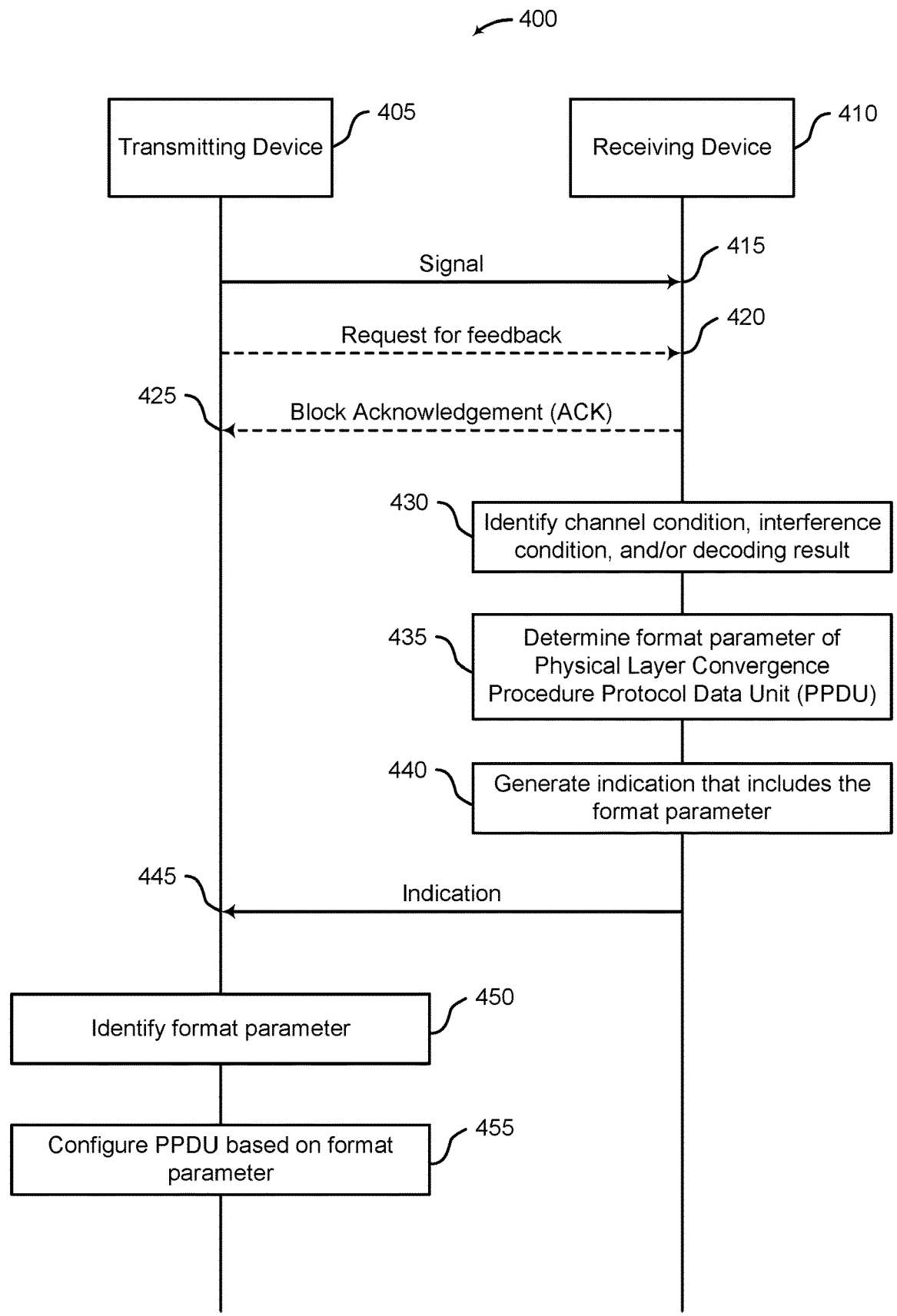
FIG. 4 shows an example communication scheme that supports techniques for selecting PPDU format parameters according to some implementations.

FIG. 4 shows an example communication scheme 400 that supports techniques for selecting PPDU format parameters according to some implementations. In some examples, communication scheme 400 may implement aspects of wireless communication systems 100 or 200. The communication scheme 400 illustrates communications and functions of a transmitting device 405 and a receiving device 410. The transmitting device 405 may be an example of the transmitting device 205 described with reference to FIG. 2. The receiving device 410 may be an example of the receiving device 210 described with reference to FIG. 2.

The communication scheme 400 illustrates configuring format parameters of a PPDU using feedback from the receiving device 410. The communication scheme 400 may be configured to adjust different parameters of the PPDU. For example, the communication scheme 400 may be used in conjunction with communication schemes 500, 700, 900, or various combinations thereof to configure PPDUs.

The transmitting device 405 may transmit a signal 415. The signal 415 may include one or more PPDUs. The signal 415 may include user-plane data or control-plane data or both. The signal 415 may be an example of any type of message or transmission. The receiving device 410 may be configured to generate feedback information associated with the signal 415 and to transmit the feedback information to the transmitting device 405. The receiving device 410 may send the feedback autonomously, or upon request of the transmitting device 405, or some combination of these options.

In some cases, the receiving device 410 may generate and send feedback information based on a request 420 received from the transmitting device 405. The transmitting device 405 may determine to transmit a request 420 based on any number of factors including a timer, one or more channel conditions, one or more interference conditions, one or more block ACKs, other factors, or combinations thereof. In some examples, the request 420 may be included in the signal 415 or may be its own message.

In some cases, the receiving device 410 may be configured to generate and send feedback information automatically. In this automatic configuration, the receiving device 410 may transmit feedback information (for example, format parameters) based on a timer expiring or some other measurement (for example, number of resources received/transmitted without providing feedback). In some examples, the receiving device 410 may be configured to transmit feedback information based on satisfying one or more criteria. For example, if the receiving device 410 determines that one or more channel conditions, interference conditions, and/or decoding results change suddenly or that measured channel conditions, interference conditions, and/or decoding results are different from expected channel conditions, interference conditions, and/or decoding results, the receiving device 410 may transmit the feedback information to the transmitting device 405. In some examples, the receiving device 410 may be continuously calculating channel conditions, interference conditions, and/or decoding results.

In some cases, the receiving device 410 may transmit a block ACK 425 in response to receiving the signal 415. The block ACK 425 may indicate to the transmitting device 405 that the signal 415 was received. In some instances, the block ACK 425 may be a reverse link block ACK. Although the transmitting device 405 may be able to determine some information (for example, channel conditions and/or interference conditions) based on the block ACK 425, the transmitting device 405 may not be able to accurately estimate a need for various configurations of a PPDU based on the block ACK 425 alone.

For example, the transmitting device 405 may not be able to accurately estimate a need for a mid-amble and/or a mid-amble interval based on the block ACK 425. In such examples, the transmitting device 405 may not be able to detect a Doppler shift using the block ACK 425 because of its short length (for example, circa seventy microseconds). In another example, the transmitting device 405 may not be able to accurately estimate an optimal GI duration using the block ACK 425 due to its short length. In such examples, the receiving device 410 may be in a better position to measure channel variations (for example, a Doppler shift and/or GI durations) because the signal 415 may be longer than the block ACKs 425. In such examples, the receiving device 410 may be able to identify whether decoding failure is due to a Doppler shift, delay spread, or interference better than the transmitting device 405.

The receiving device 410 may be configured to, at block 430, identify a channel condition, an interference condition, and/or a decoding result. The receiving device 410 may measure one or more parameters of the signal 415 or some other signals when identifying the channel condition, interference condition, and/or decoding result. For example, the receiving device 410 may identify the channel condition, interference condition, and/or decoding result based on previous signals received from the transmitting device 405 other than the signal 415. A channel condition or an interference condition may be an example of signal strength, signal quality, path loss, channel variation, Doppler shift, fading, scattering, power decay, data rates, channel gain, delay spread, jitter, other types of channel conditions, or combination thereof. A decoding result may indicate whether the signal 415 was successfully decoded by the receiving device 410. The decoding result may also be considered a reception result which may indicate whether the signal 415 was successfully received by the receiving device 410.

At block 435, the receiving device 410 may determine one or more format parameters for a PPDU based on the identified channel conditions, interference conditions, and/or decoding results. The format parameter for the PPDU may represent a recommended configuration of a subsequent PPDU selected by the receiving device 410, but implemented by the transmitting device 405. Upon receiving the format parameter, the transmitting device 405 may determine whether to implement the recommended configuration.

To determine a format parameter, the receiving device 410 may compare the identified channel conditions, interference conditions, and/or decoding results to one or more sets of criteria. The criteria may include absolute criteria, such as a predetermined threshold. The criteria may include relative criteria, such as a threshold that is based on previous channel conditions, interference conditions, and/or decoding results. As an example of a relative criterion, the receiving device 410 may monitor rates of change of various channel conditions, interference conditions, and/or decoding results. If the channel conditions, interference conditions, and/or decoding results satisfy the criteria or threshold (whether absolute or relative), the receiving device 410 may identify one or more types of format parameter to determine. For example, if a first set of conditions satisfy a first criteria, the receiving device 410 may determine that the PPDU may include a mid-amble. If a second set of conditions satisfy a second criteria, the receiving device 410 may determine a guard interval for the PPDU. Other criteria and format parameters are included in this disclosure. The receiving device 410 may configured to determine a plurality of format parameters at once in various combinations. In some examples, the receiving device 410 may determine format parameters based on predetermined values included in a look-up table. In some examples, the receiving device 410 may determine format parameters dynamically based on the values of the identified channel conditions, interference conditions, and/or decoding results.

Format parameters may be examples of characteristics of a PPDU (such as those described above with reference to FIG. 3) that may be modified by the transmitting device 405 before transmitting a signal. The receiving device 410 may be configured to determine any number of format parameters. Format parameters for a PPDU that may be determined by the receiving device 410 may indicate a type of PPDU that may be transmitted to the receiving device 410 in a subsequent signal, a bandwidth of the subsequent PPDU, a guard interval or a size of a HE-LTF or both for a subsequent PPDU, whether the PPDU is to include a mid-amble (for example, a Doppler mode bit), whether the subsequent PPDU includes multiple mid-ambles, a number of data symbols between two mid-ambles, an offset of a first mid-amble of the subsequent PPDU from a start of the HE training fields in the preamble of the subsequent PPDU, whether the mid-amble includes a short HE-STF, a full HE-STF, or no HE-STF, a number of HE-LTFs in the mid-amble, or combinations thereof.

At block 440, the receiving device 410 may generate an indication 445 of the determined format parameter or parameters. The indication 445 may be included in an existing data structure. For example, the indication 445 may be included in existing management frames, existing HE control fields such as a high efficiency link adaptation (HLA) control field or an operating mode indication (OMI) control field. In some examples, the HLA control field may be extended with new subfields to include the indication 445 of recommended format parameters for a subsequent PPDU determined by the receiving device 410. The indication 445 may be included in a new data structure, in some examples. For example, the indication 445 may be transmitted as its own message by the receiving device 410 to the transmitting device 405. The indication 445 may be an example of the feedback 220 described with reference to FIG. 2. In some examples, the indication 445 may include the channel conditions, interference conditions, and/or the decoding results identified by the receiving device 410.

At block 450, the transmitting device 405 may identify one or more recommended format parameters based on receiving the indication 445. The transmitting device 405 may decode a signal to obtain the indication 445 transmitted by the receiving device 410.

At block 455, the transmitting device 405 may configure a subsequent PPDU for transmission based at least in part on a format parameter included in the indication 445. The transmitting device 405 may compare the format parameter(s) included in the indication 445 to the current parameters used to configure a PPDU. The transmitting device 405 may determine whether to use the format parameters included in the indication 445 or select some other format parameters.

When making this determination, the transmitting device 405 may consider (among other factors) channel conditions, network conditions, interference conditions, and/or decoding results obtained from sources other than the receiving device 410. In some examples, the transmitting device 405 may identify at least some of these conditions directly. In some examples, the indication 445 may include the channel conditions, interference conditions, and/or the decoding results identified by the receiving device 410 and the transmitting device 405 may use those identified conditions and results to determine the format parameters to use to configure the subsequent PPDUs. The transmitting device 405 may modify the configuration of the subsequent PPDUs based on the format parameters received from the receiving device 410.

Figure 5:
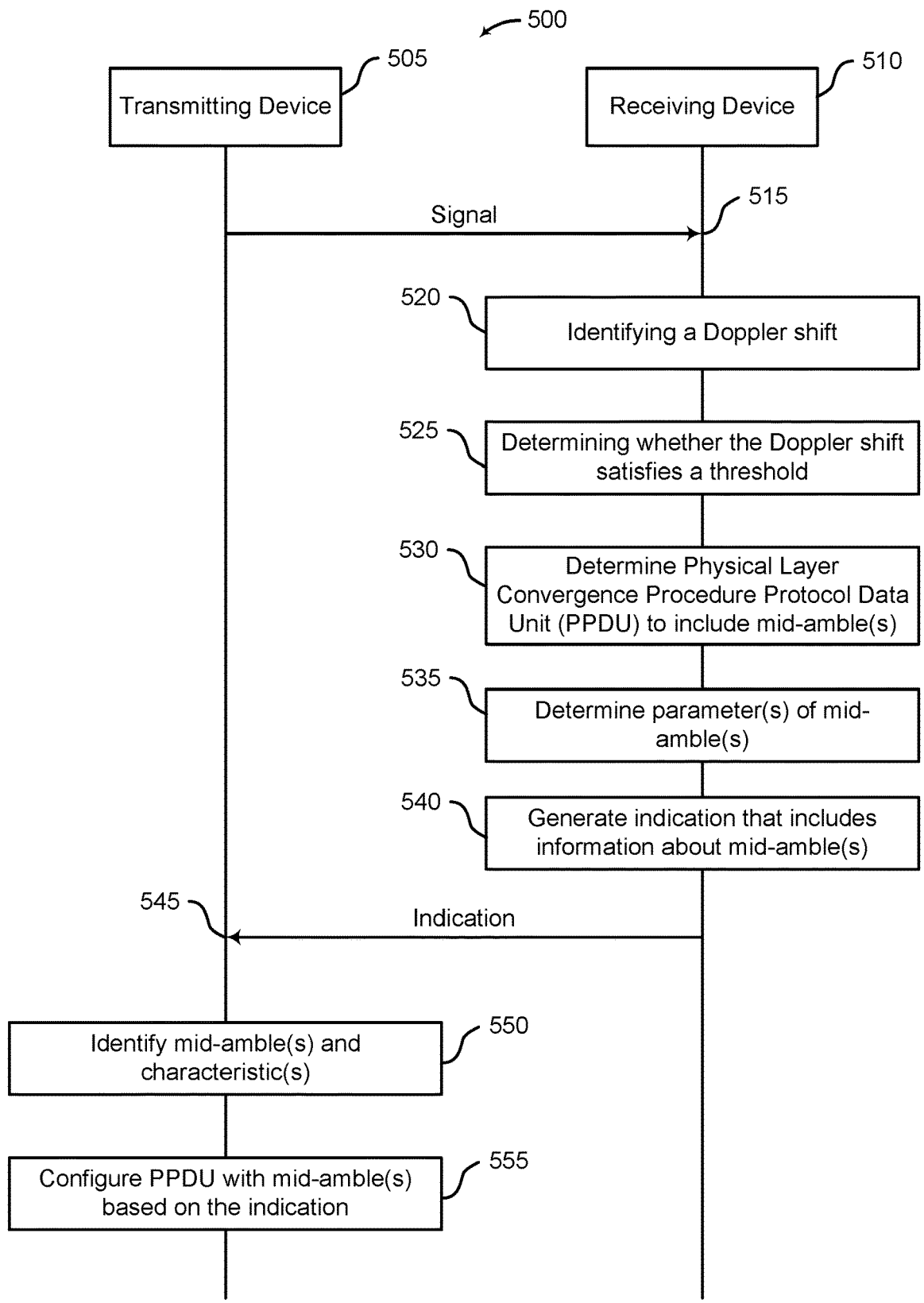
FIG. 5 shows an example communication scheme that supports techniques for selecting PPDU format parameters according to some implementations.

FIG. 5 shows an example communication scheme 500 that supports techniques for selecting PPDU format parameters according to some implementations. In some examples, communication scheme 500 may implement aspects of wireless communication systems 100 or 200. The communication scheme 500 illustrates communications and functions of a transmitting device 505 and a receiving device 510. The transmitting device 505 may be an example of the transmitting device 205, 405 described with reference to FIGS. 2 and 4. The receiving device 510 may be an example of the receiving device 210, 410 described with reference to FIGS. 2 and 4.

The communication scheme 500 may illustrate configuring Doppler related format parameters of a PPDU using feedback from the receiving device 510. The communication scheme 500 may incorporate some or all of the techniques of communication scheme 400 described with reference to FIG. 4. As such, not all of the details of the communication scheme 400 are repeated in communication scheme 500. In addition, the communication scheme 500 may be combined in various ways with the techniques described in the communication schemes 700 and 900.

The transmitting device 505 may be configured to transmit a signal 515. The signal 515 may include one or more PPDUs. The signal 515 may be an example of the signal 415 described with reference to FIG. 4. The receiving device 510 may be configured to provide feedback to the transmitting device 505 regarding recommended format parameters of subsequent PPDUs to be transmitted to the receiving device 510. The receiving device 510 may send feedback automatically to the transmitting device 505 or upon request of the transmitting device 505, as described with reference to FIG. 4.

At block 520, the receiving device 510 may identify a Doppler shift of a signal transmitted by the transmitting device 505. In some examples, the receiving device 510 may identify a Doppler shift of the signal 515. Identifying a Doppler shift may be an example of identifying a channel condition, interference condition, and/or decoding result described with reference to block 430 of FIG. 4.

The receiving device 510 may identify a Doppler shift using a variety of methods. In some examples, the receiving device 510 may identify the Doppler shift based on beacons transmitted by the transmitting device 505. The beacons may be included in the signal 515 and/or other signals transmitted by transmitting device 505.

Based on differences between a measured beacon value and an expected beacon value, the receiving device 510 may be able to identify a Doppler shift in a signal. In some examples, the receiving device 510 may be configured to identify a Doppler shift based on a decoding result of the signal 515 and/or other signals received from the transmitting device 505. In some examples, the receiving device 510 may be configured to identify a Doppler shift based on an elapsed time for a training field included in the signal 515 and/or other signals received from the transmitting device 505. In some examples, the receiving device 510 may be configured to identify a Doppler shift based on pilot carriers or sub-carriers included in a PPDU.

The receiving device 510 may determine correlations between the pilot carriers or sub-carriers to identify a Doppler shift. In some examples, the receiving device 510 may identify a Doppler shift based on motion and location data. The receiving device 510 may use sensors (for example, GPS, accelerometers) to determine a location of the receiving device 510, a direction and/or speed of travel of the receiving device, or other similar characteristics. Based on those position and motion parameters, the receiving device 510 may determine the Doppler shift.

At block 525, the receiving device 510 may determine whether the Doppler shift satisfies a threshold. The threshold may be a preconfigured threshold based on the Doppler shift exceeding a predetermined value. The threshold may be a relative threshold based on a previous Doppler shift. As an example of such a relative criterion, if the current Doppler shift changes too quickly from previous Doppler shifts, the threshold may be satisfied. A relative threshold may be configured based on a previous value and delta value indicating the amount of permissible change in the next Doppler shift.

At block 530, the receiving device 510 may determine whether a subsequent PPDU may include one or more mid-ambles based at least in part on identifying a Doppler shift. The one or more mid-ambles may be configured to identify channel variations across an entire PPDU included in a signal transmitted by the transmitting device 505.

At block 535, the receiving device 510 may determine one or more parameters associated with the mid-ambles. For example, the receiving device 510 may determine whether a subsequent PPDU may include a Doppler mode bit that is toggled. Such a Doppler mode bit may be included in an HE-SIG-A field of a PPDU, in some examples. The receiving device 510 may determine whether the subsequent PPDU includes multiple mid-ambles, a mid-amble interval indicating a number of data symbols between two mid-ambles.

The receiving device 510 may determine an offset of a first mid-amble of the subsequent PPDU from a start of the HE training fields in the preamble of the subsequent PPDU. The receiving device 510 may determine whether the mid-amble includes a short HE-STF, a full HE-STF, or no HE-STF. The receiving device 510 may determine a number of HE-LTFs in the mid-amble. The receiving device 510 may determine any combination of these mid-amble parameters. Whether the PPDU includes one or more mid-ambles or these characteristics described above may be examples of format parameters described with reference to FIG. 4.

In some examples, the mid-amble interval may indicate an exact value of data symbols between mid-ambles (for example, x number of data symbols). In some examples, a mid-amble interval may be an index value. In such examples, an index value of zero may mean there is no mid-amble in the PPDU or no second mid-amble in the PPDU, an index value of one may indicate a first value of data symbols (for example, ten data symbols), an index value of two may indicate a second value of data symbols different from the first value (for example, twenty data symbols), or the like.

In some examples, a size parameter of the mid-ambles may indicate the number of HE-LTFs in the mid-amble, whether the mid-amble includes an HE-STF, or the sizes of the training functions (both HE-LTFs and HE-STF) in the mid-amble. Size indications of training functions may include 1×, 2×, 4×, among other examples. For example, a size indicator set to 0 may indicate that a one-time (1×) duration of HE-LTF and 0.08 µs GI may be used. The size indicator 0 may handle the least delay spread. A size indicator set to 1 may indicate that a two-time (2×) extended duration of HE-LTF and 0.08 µs GI may be used. The size indicator 1 may provide a more robust channel estimation with a larger delay spread than the size indicator 0. A size indicator set to 2 may indicate that a two-time (2×) extended duration of HE-LTF and 1.6 µs GI may be used. The size indicator 2 may provide a more protection against indoor interference for a larger delay spread than the size indicator 1 or 2. A size indicator set to 3 may indicate a four-time (4×) extended HE-LTF and 0.8 µs when both dual carrier modulation (DCM) and space time block coding (STBC) are 1. In some cases, neither DCM nor STBC may be applied when both DCM and STBC are set to 1. In some examples, the size indicator 3 may indicate a four-time (4×) extended HE-LTF and 3.2 µs GI.

In some examples, a guard interval parameter of the mid-ambles may indicate a guard interval duration. Examples of guard interval durations may include 0.8 microseconds, 1.6 microseconds, 3.2 microseconds, or the like.

In some examples, various combinations of these parameters and configurations associated with mid-ambles may indexed into a combined mid-amble format parameter. In such examples, each index value may indicate a predetermined configuration of the parameters discussed above.

At block 540, the receiving device 510 may generate an indication 545 that includes information about the one or more mid-ambles. The indication 545 may include any of the parameters or characteristics discussed above. The indication 545 may be an example of the indication 445 described with reference to FIG. 4.

At block 550, the transmitting device 505 may identify one or more recommended format parameters associated with mid-ambles based on receiving the indication 545. The transmitting device 505 may decode a signal to obtain the indication 545 transmitted by the receiving device 510.

At block 555, the transmitting device 505 may configure a subsequent PPDU for transmission based at least in part on a format parameter associated with the mid-ambles included in the indication 545. For example, the enable a Doppler mode (for example, indicating that the PPDU includes at least one mid-amble) by toggling a bit in the HE-SIG-A field of the PPDU. In some examples, the transmitting device 505 may use a short HE PPDU with a duration less than a threshold (for example, the threshold may be 0.5 milliseconds), and with a Doppler bit in the HE-SIG-A field enabled. In such an example, no new bits may be included in the PPDU. The transmitting device 505 may compare the format parameter(s) included in the indication 545 to the current parameters used to configure a PPDU. The transmitting device 505 may determine whether to use the format parameters included in the indication 545 or select some other format parameters. When making this determination, the transmitting device 505 may consider (among other factors) channel conditions, network conditions, interference conditions, or decoding results obtained from sources other than the receiving device 510. In some examples, the transmitting device 505 may identify at least some of these conditions directly. In some examples, the indication 545 may include the channel conditions, interference conditions, or the decoding results identified by the receiving device 510 and the transmitting device 505 may use those identified conditions and results to determine the format parameters associated with mid-ambles to use to configure the subsequent PPDUs. The transmitting device 505 may modify the configuration of the subsequent PPDUs based on the format parameters received from the receiving device 510.

Figure 6:
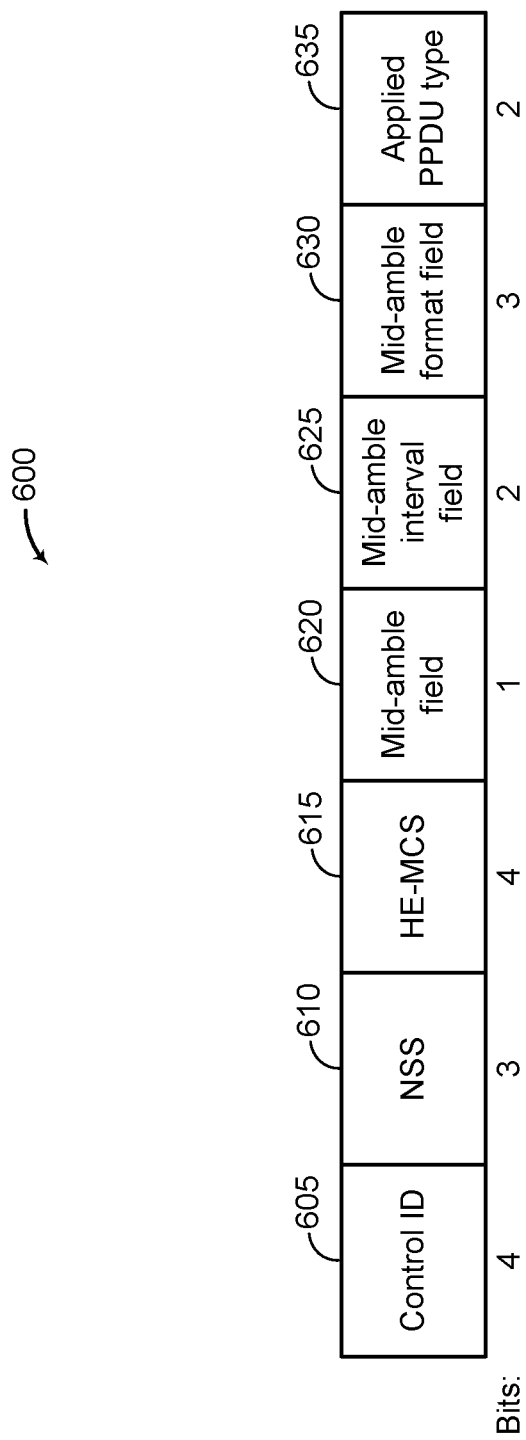
FIG. 6 shows an example message structure that supports techniques for selecting PPDU format parameters according to some implementations.

FIG. 6 shows an example message structure 600 that supports techniques for selecting PPDU format parameters according to some implementations. In some examples, message structure 600 may implement aspects of wireless communication systems 100 or 200.

The receiving device 510, may transmit the indication 545 to the transmitting device 505 in a variety of different ways. The message structure 600 may be an example of HLA control field that has been extended to include the indication 545 (for example, format parameters associated with mid-ambles). The message structure 600 may be an example of a HE variant high throughput control field. A HE variant high throughput control field may carry multiple control subfields identified by different control identifiers (IDs). The message structure 600 may be included in a MAC header of any possible frame (for example, data, quality of service (QoS) null data, a control wrapper for a control frame such as a block ACK). An HLA control field may have an assigned control ID subfields of 2 (for example, Control ID subfield, control information subfield, or the like).

The message structure 600 may include a control identification field 605, a network switching subsystem (NSS) field 610, and a high efficiency modulation and coding scheme (HE-MCS) field 615. As such, the receiving device 210 may use an existing MAC frame to indicate the information associated with Doppler shift to the transmitting device 205 without including a new bit in the MAC header. The message structure 600 may also be extended with a mid-amble field 620, a mid-amble interval field 625, a mid-amble format field 630, or an applied PPDU format field 635. These three fields 620, 625, 630, 635 may include the indication 545, in some examples.

The mid-amble field 620 may indicate whether the next PPDU may include one or more mid-ambles. The mid-amble field 620 may be a single bit. In some examples, the mid-amble field 620 may be an example of an enabling Doppler mode field. If the bit of the 620 is toggled, the indication 545 may recommend that the future PPDUs include mid-ambles.

The mid-amble interval field 625 may indicate a number of data symbols between mid-ambles in the next PPDU. The interval between mid-ambles may be determined based on the Doppler shift identified by the receiving device 510. The mid-amble interval field 625 may be two bits. Information included in the mid-amble interval field 625 may include index values. For example, an index value may indicate how many data symbols are between two mid-ambles. In some examples, one of the index value may indicate that there is no interval (meaning that the PPDU may include on a single mid-amble).

The mid-amble format field 630 may indicate any of the other parameters associated with mid-ambles described herein. The mid-amble format field 630 may be three bits. Information included in the mid-amble format field 630 may include index values. For example, each index value may indicate a specific combination of mid-amble parameters to be included in future PPDUs.

The applied PPDU type field 635 may include an index value of the applied PPDU type that the PPDU format parameters may be applied to. The applied PPDU types may include a HE SU PPDU, a HE ER SU PPDU, a HE MU PPDU, or HE TB PPDU, for example. The applied PPDU type field 635 may be two bits.

The message structure 600 may include different or additional fields or subfields to communicate information associated with mid-ambles in future PPDUs. In addition, the number of bits assigned to each field may be modified or altered based on implementations. The message structure 600 represents an illustrative example only and is not limiting.

Figure 7:
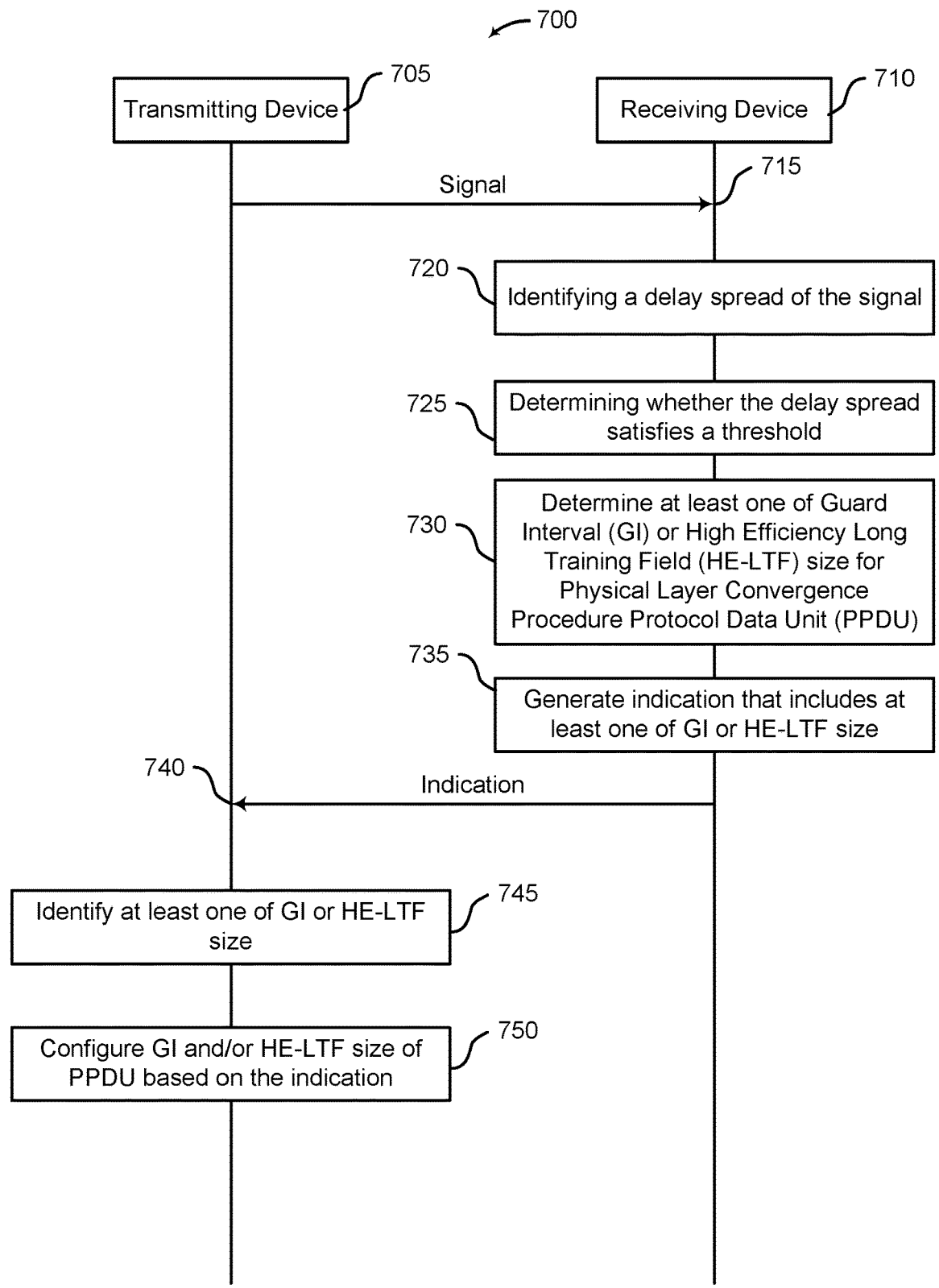
FIG. 7 shows an example communication scheme that supports techniques for selecting PPDU format parameters according to some implementations.

FIG. 7 shows an example communication scheme 700 that supports techniques for selecting PPDU format parameters according to some implementations. In some examples, communication scheme 700 may implement aspects of wireless communication systems 100 or 200. The communication scheme 700 illustrates communications and functions of a transmitting device 705 and a receiving device 710. The transmitting device 705 may be an example of the transmitting device 205, 405 described with reference to FIGS. 2 and 4. The receiving device 710 may be an example of the receiving device 210, 410 described with reference to FIGS. 2 and 4.

The communication scheme 700 may illustrate configuring guard interval or HE-LTF size related format parameters of a PPDU using feedback from the receiving device 710. The communication scheme 700 may incorporate some or all of the techniques of communication scheme 400 described with reference to FIG. 4. As such, not all of the details of the communication scheme 400 are repeated in communication scheme 700. In addition, the communication scheme 700 may be combined in various ways with the techniques described in the communication schemes 500 and 900.

The transmitting device 705 may be configured to transmit a signal 715. The signal 715 may include one or more PPDUs. The signal 715 may be an example of the signal 415 described with reference to FIG. 4. The receiving device 710 may be configured to provide feedback to the transmitting device 705 regarding recommended format parameters of subsequent PPDUs to be transmitted to the receiving device 710. The receiving device 710 may send feedback automatically (for example, in a power save (PS) poll frame, QoS-null frame, or the like) to the transmitting device 705 or upon request (for example, by polling) of the transmitting device 705, as described with reference to FIG. 4.

At block 720, the receiving device 710 may identify a delay spread of a signal transmitted by the transmitting device 705. In some examples, the receiving device 710 may identify a delay spread of the signal 715. Identifying a delay spread may be an example of identifying a channel condition, interference condition, or decoding result described with reference to block 430 of FIG. 4. The delay spread may refer to a difference between an arrive time of an earliest multipath component and an arrival time of a last multipath component of a transmitted signal. Delay spread may cause inter-symbol interference in the signal.

The receiving device 710 may identify a delay spread using a variety of methods. In some examples, the receiving device 710 may identify the delay spread based on beacons transmitted by the transmitting device 705. The beacons may be included in the signal 715 or other signals transmitted by transmitting device 705. Based on differences between a measured beacon value and an expected beacon value, the receiving device 710 may be able to identify a delay spread in a signal. In some examples, the receiving device 710 may be configured to identify a delay spread based on a decoding result of the signal 715 or other signals received from the transmitting device 705.

At block 725, the receiving device 710 may determine whether the delay spread satisfies a threshold. The threshold may be a preconfigured threshold based on the delay spread exceeding a predetermined value. The threshold may be a relative threshold based on a previous delay spread. As an example of such a relative criterion, if the current delay spread changes too quickly from previous delay spreads, the threshold may be satisfied. A relative threshold may be configured based on a previous value and delta value indicating the amount of permissible change in the next delay spread.

At block 730, the receiving device 710 may determine a guard interval duration for a subsequent PPDU or a HE-LTF size for a subsequent PPDU or both. Increasing a guard interval duration may reduce inter-symbol interference and thereby address some of the effects of delay spread. In some cases, the receiving device 710 may determine one or more parameters associated with the guard interval duration or the HE-LTF sizes. The receiving device 710 may determine a guard interval duration for a future PPDU. In some examples, the guard interval duration may be directly communicated to the transmitting device 705 (for example, the guard interval duration may indicate a time value). In some examples, an index value may be used to indicate a guard interval duration. For example, an index may include values (for example, 0, 1, or 2) for guard interval durations of 0.8 microseconds, 1.6 microseconds, 3.2 microseconds, among other examples. The receiving device 710 may determine a HE-LTF size for a future PPDU. In some examples, the HE-LTF size may be directly communicated to the transmitting device 705 (for example, the number of bits for each HE-LTF). In some examples, an index value may be used to indicate a HE-LTF size. In some cases, HE-LTF sizes may be indexed by multiples of a baseline size (for example, 1×, 2×, or 4×).

In some examples, various combinations of these parameters and configurations may be indexed into a combined format parameter. In such examples, each index value may indicate a predetermined configuration of a guard duration and a HE-LTF size.

In some examples, the receiving device 410 may generate PPDU type parameter indicating which type of PPDU (for example, HE SU PPDU, HE ER SU PPDU, HE MU PPDU, HE TB PPDU) the parameters are to be applied to. In some cases, the type of PPDU may modify the specific values of the guard interval duration or the HE-LTF sizes being applied.

At block 735, the receiving device 710 may generate an indication 740 that includes information about the guard interval duration or the HE-LTF sizes. The indication 740 may include any of the parameters or characteristics discussed above. The indication 740 may be an example of the indication 445 described with reference to FIG. 4.

At block 745, the transmitting device 705 may identify one or more recommended format parameters based on receiving the indication 740. The transmitting device 705 may decode a signal to obtain the indication 740 transmitted by the receiving device 710.

At block 750, the transmitting device 705 may configure a subsequent PPDU for transmission based at least in part on one or more format parameters associated with guard interval durations and HE-LTF sizes included in the indication 740. The transmitting device 705 may compare the format parameters included in the indication 740 to the current parameters used to configure a PPDU. The transmitting device 705 may determine whether to use the format parameters included in the indication 740 or select some other format parameters.

When making this determination, the transmitting device 705 may consider (among other factors) channel conditions, network conditions, interference conditions, or decoding results obtained from sources other than the receiving device 710. In some examples, the transmitting device 705 may identify at least some of these conditions directly. In some examples, the indication 740 may include the channel conditions, interference conditions, or the decoding results identified by the receiving device 710 and the transmitting device 705 may use those identified conditions and results to determine the format parameters associated with guard interval durations and HE-LTF sizes to use to configure the subsequent PPDUs. The transmitting device 705 may modify the configuration of the subsequent PPDUs based on the format parameters received from the receiving device 710.

The receiving device 710, may transmit the indication 740 to the transmitting device 705 in a variety of different ways.

Figure 8:
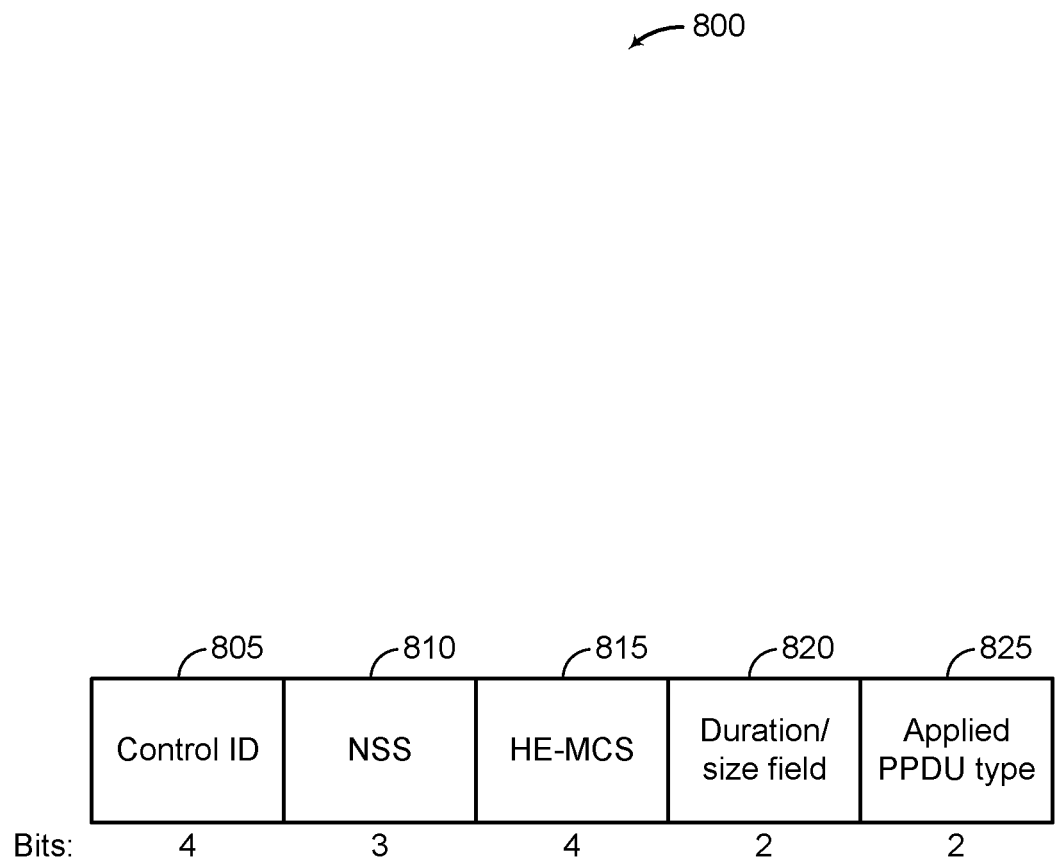
FIG. 8 shows an example message structure that supports techniques for selecting PPDU format parameters according to some implementations.

FIG. 8 shows an example message structure 800 that supports techniques for selecting PPDU format parameters according to some implementations. In some examples, message structure 800 may implement aspects of wireless communication systems 100 or 200.

The message structure 800 may be an example of HLA control field that has been extended to include the indication 740 (for example, format parameters associated with guard interval durations and HE-LTF sizes). The message structure 800 may be an example of a HE variant high throughput control field. The message structure 800 may be included in a MAC header of any possible frame (for example, data, QoS null data, a control wrapper for a control frame such as a block ACK.

The message structure 800 may include a control identification field 805, a NSS field 810, and a HE-MCS field 815. As such, the receiving device 210 may use an existing MAC frame to indicate the information associated with GI durations and HE-LTF sizes to the transmitting device 205 without including a new bit in the MAC header. The message structure 800 may also be extended with a duration/size field 820 or an applied PPDU type field 825. The fields 820, 825 may include the indication 740, in some examples.

The duration/size field 820 may include an index value that indicates both a guard interval duration and a HE-LTF size. The duration/size field 820 may be two bits. In some examples, individual fields may be used to indicate the guard interval duration and the HE-LTF size.

The applied PPDU type field 825 may include an index value of the applied PPDU type that the indicated PPDU format parameters may be applied to. The applied PPDU types may include a HE SU PPDU, a HE ER SU PPDU, a HE MU PPDU, or HE TB PPDU, for example. The applied PPDU type field 825 may be two bits.

The message structure 800 may include different or additional fields or subfields to communicate information associated with future PPDUs. In addition, the number of bits assigned to each field may be modified or altered based on implementations. The message structure 800 represents an illustrative example only and is not limiting.

Figure 9:
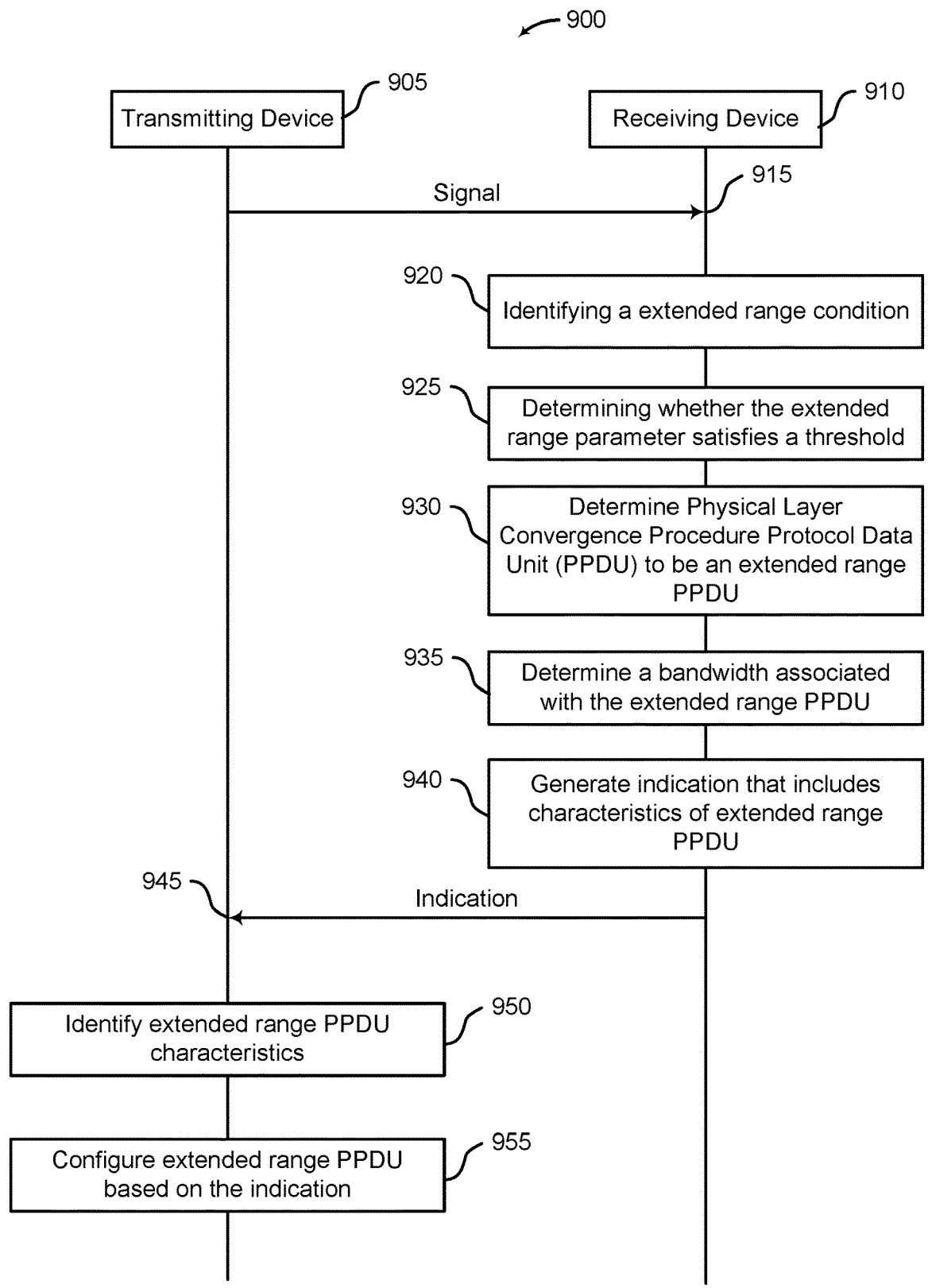
FIG. 9 shows an example communication scheme that supports techniques for selecting PPDU format parameters according to some implementations.

FIG. 9 shows an example communication scheme 900 that supports techniques for selecting PPDU format parameters according to some implementations. In some examples, communication scheme 900 may implement aspects of wireless communication systems 100 or 200. The communication scheme 900 illustrates communications and functions of a transmitting device 905 and a receiving device 910. The transmitting device 905 may be an example of the transmitting device 205, 405 described with reference to FIGS. 2 and 4. The receiving device 410 may be an example of the receiving device 210, 410 described with reference to FIGS. 2 and 4.

The communication scheme 900 may illustrate configuring extended range related format parameters of a PPDU using feedback from the receiving device 910. The communication scheme 900 may incorporate some or all of the techniques of communication scheme 400 described with reference to FIG. 4. As such, not all of the details of the communication scheme 400 are repeated in communication scheme 900. In addition, the communication scheme 900 may be combined in various ways with the techniques described in the communication schemes 500 and 700.

The transmitting device 905 may be configured to transmit a signal 915. The signal 915 may include one or more PPDUs. The signal 915 may be an example of the signal 415 described with reference to FIG. 4. The receiving device 910 may be configured to provide feedback to the transmitting device 905 regarding recommended format parameters of subsequent PPDUs to be transmitted to the receiving device 910. The receiving device 910 may send feedback automatically to the transmitting device 905 or upon request of the transmitting device 905, as described with reference to FIG. 4.

At block 920, the receiving device 910 may identify conditions associated with using extended range PPDUs for a signal transmitted by the transmitting device 905. In some examples, the receiving device 910 may identify conditions associated with using extended range PPDUs of the signal 915. Identifying conditions associated with using extended range PPDUs may be an example of identifying a channel condition, interference condition, or decoding result described with reference to block 430 of FIG. 4.

Extended range PPDUs may be used in situations where the distance between the transmitting device 905 and the receiving device 910 is great. Such situations may occur in an outdoor mobility environment, among other environments. A number of different conditions may be used to determine whether to use extended range PPDUs. For example, such conditions may include the positions of the transmitting device 905 and the receiving device 910, an identified path loss of signals transmitted by the transmitting device 905, an identified signal strength of signals transmitted by the transmitting device 905, or combinations thereof.

In some cases, the receiving device 910 may determine a distance between the receiving device 910 and the transmitting device 905. The receiving device 910 may determine a position of the transmitting device 905 and a position of the receiving device 910 before determining the distance. In some examples, determining the distances may be based on global positioning system (GPS) data of the two devices 905, 910. In some examples, determining the distance may be based on other measures of distance including path loss, signal strength, and transmission times. For example, the transmitting device 905 may transmit a signal that includes a time-stamp about when it was transmitted. The receiving device 910 may determine a distance based on difference between transmission time and reception time. The receiving device 910 may determine whether the identified distance satisfies a threshold. The receiving device 910 may determine that a future PPDU may be an extended range PPDU based on the distance satisfying the threshold.

In some cases, the receiving device 910 may measure a path loss of a communication link between the transmitting device 905 and the receiving device 910. The receiving device 910 may determine the path loss based on signals received from the transmitting device 905. The receiving device 910 may determine whether the identified path loss satisfies a threshold. The receiving device 910 may determine that a future PPDU may be an extended range PPDU based on the path loss satisfying the threshold.

In some cases, the receiving device 910 may determine a signal strength of a signal transmitted by the transmitting device 905 (for example, signal 915). The receiving device 910 may determine whether the identified signal strength satisfies a threshold. The receiving device 910 may determine that a future PPDU may be an extended range PPDU based on the signal strength satisfying the threshold.

At block 925, the receiving device 910 may determine whether the one or more conditions satisfy a threshold. The threshold may be a preconfigured threshold based on the conditions exceeding a predetermined value. The threshold may be a relative threshold based on a previous condition. As an example of such a relative criterion, if the current condition changes too quickly from previous conditions, the threshold may be satisfied. A relative threshold may be configured based on a previous value and delta value indicating the amount of permissible change in the next condition. In some cases, the receiving device 910 may determine that an extended range PPDU may be used based on a decoding failure rate of a HE-SIG-A field being above a threshold (for example, 5%) or on a decoding failure rate of beacon frames in a non-HE ER SU PPDU format from an associated transmitting device (for example, an access point). In some examples, a HE ER PPDU (for example, a HE ER SU PPDU) may include a 16 μs HE-SIG-A. In some cases, the HE-SIG-A may include a 8 μs HE-SIG-A that may be repeated (for example, for a total of two 8 μs HE-SIG-As) to improve robustness of the PPDU preamble.

At block 930, the receiving device 910 may determine that a future PPDU may be an extended range PPDU. The determination may be based on the conditions discussed herein.

At block 935, the receiving device 910 may determine a bandwidth associated with the extended range PPDU. In some situations, the data rate of an extended range PPDU may be reduced to extend the range of a transmitted signal. As such, in some examples, the receiving device 910 may determine whether the extended range PPDU may use less than all of its available bandwidth. For example, the receiving device 910 may determine that 106 tones may be used for the extended range PPDU instead of 242 tones. In some examples the 106 tones may be the right 106 tones of the extended range PPDU. In some cases, the receiving device 910 may determine a bandwidth for the extended range PPDU based on a MAC protocol data unit (MPDU) decoding failure rate for 242 tones being above a threshold (for example, 20%), or a narrow band interference corrupting some or all of the left-side tones.

In some examples, various combinations of these parameters and configurations associated with extended range PPDUs may be indexed into a format parameter. In such examples, each index value may indicate a predetermined configuration of the parameters discussed above. For example a first index value may indicate that the extended range PPDU is disabled, a second index value may indicate that the extended range PPDU is enabled with 242 tones, and a third index value may indicate that the extended range PPDU is enabled with 106 tones.

At block 940, the receiving device 910 may generate an indication 945 that includes information about the extended range PPDUs. The indication 945 may include any of the parameters or characteristics discussed above. The indication 945 may be an example of the indication 445 described with reference to FIG. 4.

At block 950, the transmitting device 905 may identify one or more recommended format parameters associated with the extended range PPDUs based on receiving the indication 945. The transmitting device 905 may decode a signal to obtain the indication 945 transmitted by the receiving device 910.

At block 955, the transmitting device 905 may configure a subsequent extended range PPDU for transmission based at least in part on a format parameter included in the indication 945. The transmitting device 905 may compare the format parameters included in the indication 945 to the current parameters used to configure an extended range PPDU. The transmitting device 905 may determine whether to use the format parameters included in the indication 945 or select some other format parameters.

When making this determination, the transmitting device 905 may consider (among other factors) channel conditions, network conditions, interference conditions, or decoding results obtained from sources other than the receiving device 910. In some examples, the transmitting device 905 may identify at least some of these conditions directly. In some examples, the indication 945 may include the channel conditions, interference conditions, or the decoding results identified by the receiving device 910 and the transmitting device 905 may use those identified conditions and results to determine the format parameters to use to configure the subsequent extended range PPDUs. The transmitting device 905 may modify the configuration of the subsequent extended range PPDUs based on the format parameters received from the receiving device 910.

The receiving device 910, may transmit the indication 945 to the transmitting device 905 in a variety of different ways.

Figure 10:
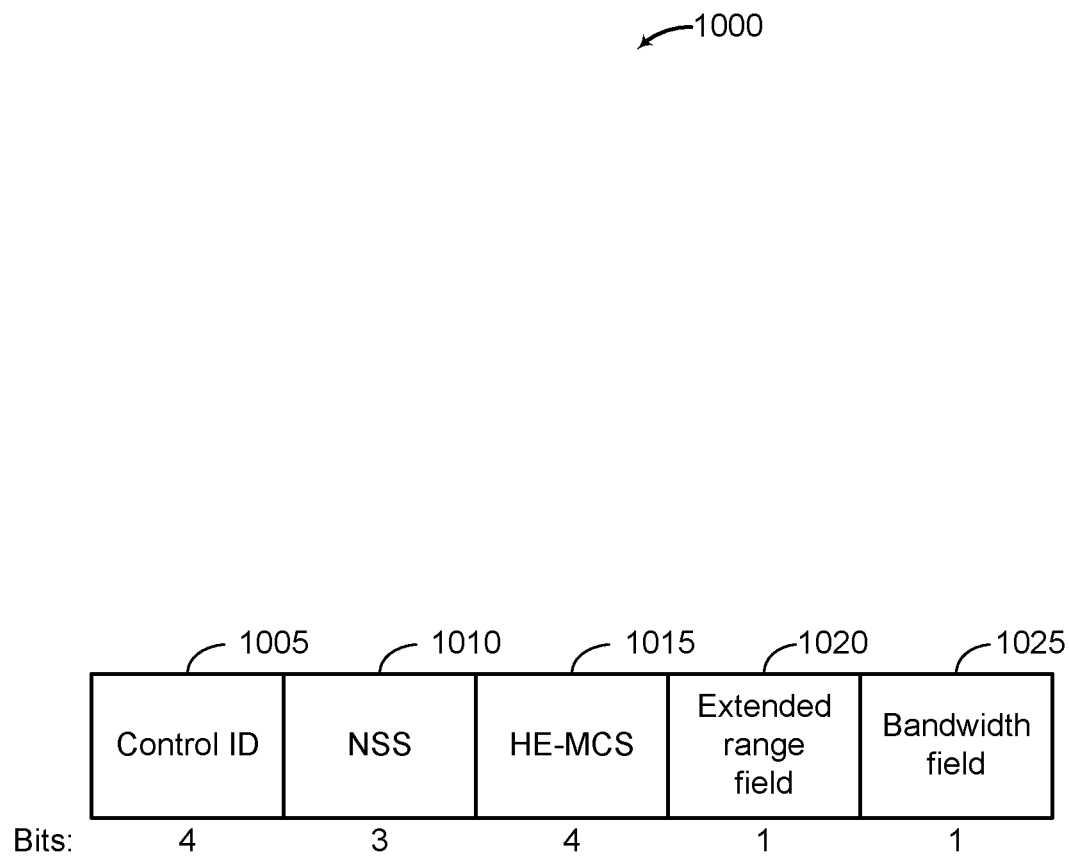
FIG. 10 shows an example message structure that supports techniques for selecting PPDU format parameters according to some implementations.

FIG. 10 shows an example message structure 1000 that supports techniques for selecting PPDU format parameters according to some implementations. In some examples, message structure 1000 may implement aspects of wireless communication systems 100 or 200.

The message structure 1000 may be an example of HLA control field that has been extended to include the indication 945 (for example, format parameters associated with guard interval durations and HE-LTF sizes). The message structure 1000 may be an example of a HE variant high throughput control field. The message structure 1000 may be included in a MAC header of any possible frame (for example, data, QoS null data, a control wrapper for a control frame such as a block ACK).

The message structure 1000 may include a control identification field 1005, a NSS field 1010, and a HE-MCS field 1015. As such, the receiving device 210 may use an existing MAC frame to indicate the information associated with ER PPDU to the transmitting device 205 without including a new bit in the MAC header. The message structure 1000 may also be extended with an extended range field 1020 or a bandwidth field 1025. The fields 1020, 1025 may include the indication 945, in some examples.

The extended range field 1020 may indicate whether a future PPDU may be an extended range PPDU (for example, a HE ER SU PPDU). In some cases, the extended range field 1020 may include a single bit that is toggled based on whether the extended range PPDU is enabled. The extended range field 1020 may be one bit.

The bandwidth field 1025 may indicate a bandwidth of an extended range PPDU. For example, the bandwidth field 1025 may include a single bit that indicates using a first bandwidth (for example, 242 tones) when at a first bit value (for example, a logic '1') and indicates using a second bandwidth (for example, 106 tones) when at a second bit value (for example, a logic '0'). The bandwidth field 1025 may be one bit.

The message structure 1000 may include different or additional fields or subfields to communicate information associated with future PPDUs. In addition, the number of bits assigned to each field may be modified or altered based on implementations. The message structure 1000 represents an illustrative example only and is not limiting.

Figure 11:
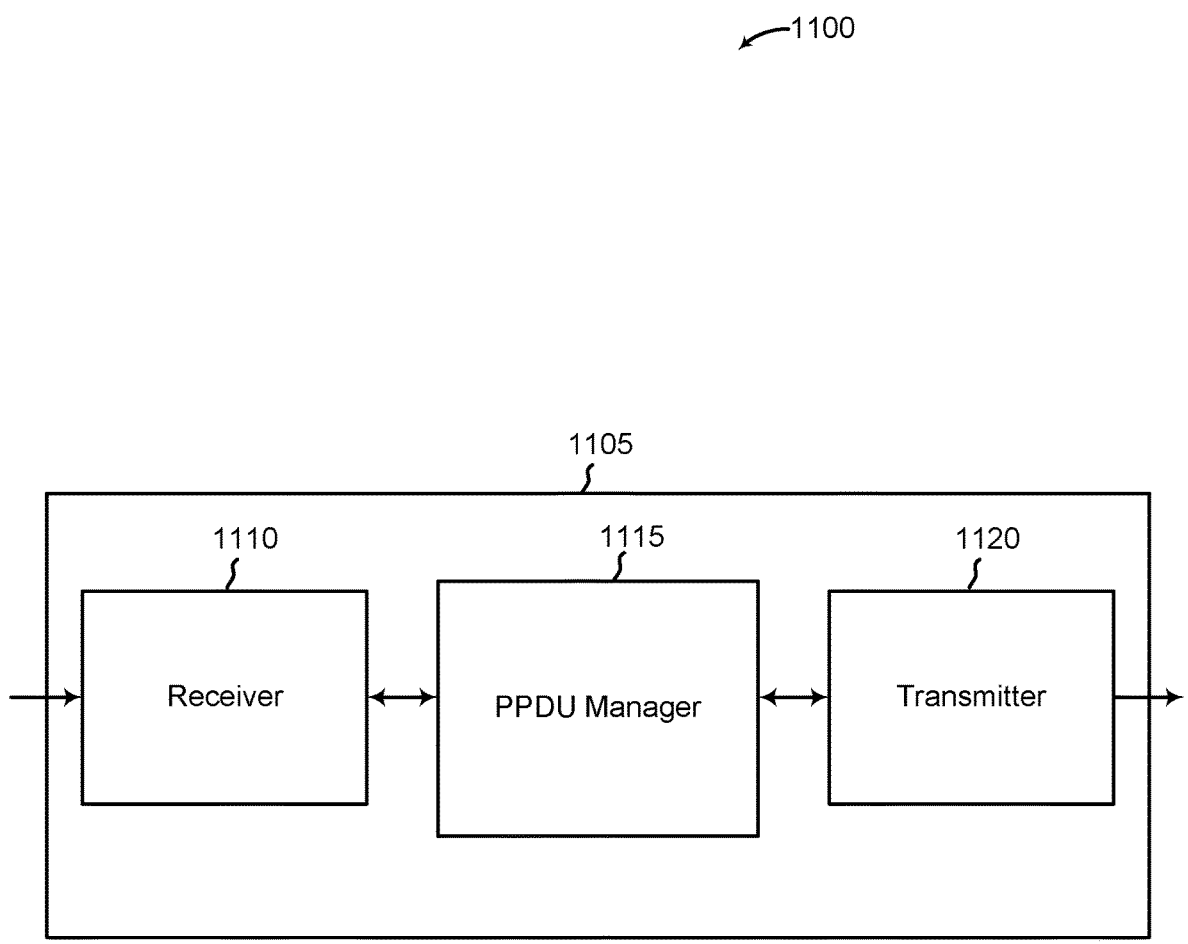
FIGS. 11 through 12 show block diagrams of a device that supports techniques for selecting PPDU format parameters according to some implementations.

FIG. 11 shows a block diagram 1100 of a device 1105 that supports techniques for selecting PPDU format parameters according to some implementations. Wireless device 1105 may be an example of aspects of a receiving device 210 as described herein. Wireless device 1105 may include receiver 1110, PPDU manager 1115, and transmitter 1120. Wireless device 1105 may also include a processor. Each of these components may be in communication with one another (for example, via one or more buses).

Receiver 1110 may receive information such as packets, user data, or control information associated with various information channels (for example, control channels, data channels, information related to techniques for selecting PPDU format parameters). Information may be passed on to other components of the device. Receiver 1110 may be an example of aspects of the transceiver 1435 described with reference to FIG. 14. Receiver 1110 may utilize a single antenna or a set of antennas.

PPDU manager 1115 may be an example of aspects of PPDU manager 1415 described below with reference to FIG. 14. PPDU manager 1115 or at least some of its various sub-components may be implemented in hardware, software executed by a processor, firmware, or any combination thereof. If implemented in software executed by a processor, the functions of PPDU manager 1115 or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. PPDU manager 1115 or at least some of its various sub-components may be physically located at various different locations, including being distributed such that portions of functions are implemented at different physical locations by one or more physical devices. In some examples, PPDU manager 1115 or at least some of its various sub-components may be a separate and distinct component in accordance with various aspects of the present disclosure. In other examples, PPDU manager 1115 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

PPDU manager 1115 may determine a Doppler shift of a signal received from a transmitter, determine a format parameter for a PPDU based on the Doppler shift of the signal, and transmit an indication of the format parameter of the PPDU to the transmitter.

PPDU manager 1115 may also determine a delay spread of a signal received from a transmitter, determine a format parameter for a PPDU based on the delay spread of the signal, and transmit an indication of the format parameter of the PPDU to the transmitter.

PPDU manager 1115 may identify a channel condition, an interference condition, or a reception result associated with a signal received from a transmitter, determine a format parameter for a PPDU based on the channel condition, the interference condition, or the reception result, and transmit an indication of the format parameter of the PPDU to the transmitter.

Transmitter 1120 may transmit signals generated by other components of the device. In some examples, transmitter 1120 may be collocated with a receiver 1110 in a transceiver module. For example, transmitter 1120 may be an example of aspects of the transceiver 1435 described with reference to FIG. 14. Transmitter 1120 may utilize a single antenna or a set of antennas.

Figure 12:
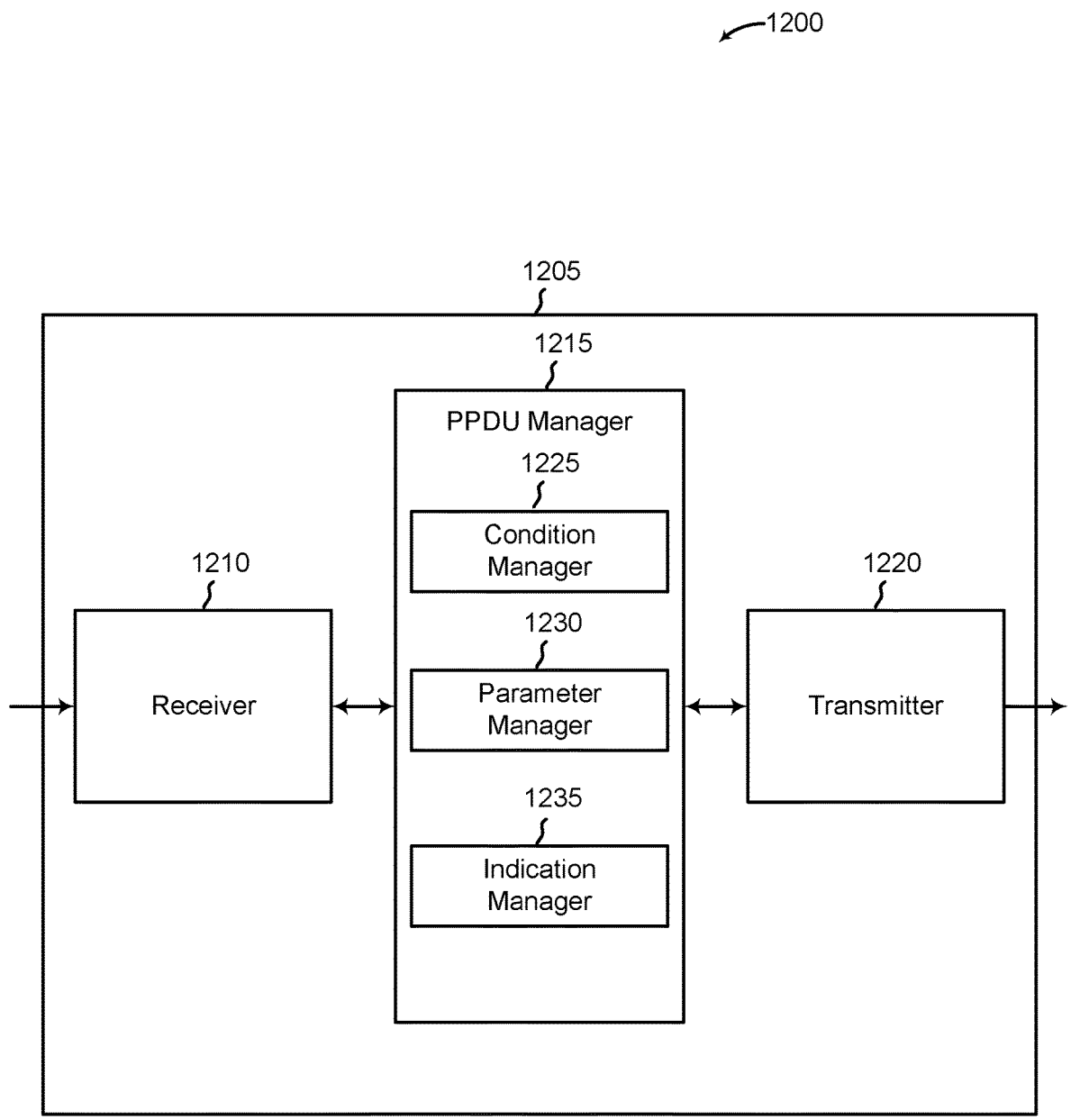

FIG. 12 shows a block diagram 1200 of a device 1205 that supports techniques for selecting PPDU format parameters according to some implementations. Wireless device 1205 may be an example of aspects of a wireless device 1105 or a receiving device 210 as described with reference to FIG. 11. Wireless device 1205 may include receiver 1210, PPDU manager 1215, and transmitter 1220. Wireless device 1205 may also include a processor. Each of these components may be in communication with one another (for example, via one or more buses).

Receiver 1210 may receive information such as packets, user data, or control information associated with various information channels (for example, control channels, data channels, information related to techniques for selecting PPDU format parameters). Information may be passed on to other components of the device. Receiver 1210 may be an example of aspects of transceiver 1435 described below with reference to FIG. 14. Receiver 1210 may utilize a single antenna or a set of antennas.

PPDU manager 1215 may be an example of aspects of PPDU manager 1415 described below with reference to FIG. 14. PPDU manager 1215 may also include condition manager 1225, parameter manager 1230, and indication manager 1235.

Condition manager 1225 may identify a channel condition, an interference condition, or a reception result associated with a signal received from a transmitter, determine a Doppler shift of the signal based on the channel condition, the interference condition, or the reception result. Condition manager 1225 may determine whether the Doppler shift satisfies a threshold, where determining the format parameter that indicates whether the PPDU is to include the mid-amble is based on determining that the Doppler shift satisfies the threshold. Condition manager 1225 may determine a delay spread of the signal based on the channel condition, the interference condition, or the reception result. Condition manager 1225 may determine whether the delay spread satisfies a threshold, where determining one or both of the guard interval or the HE-LTF size is based on determining that the delay spread satisfies the threshold. Condition manager 1225 may determine that a position of receiver 1210 relative to transmitter 1220 satisfies a threshold based on the channel condition, the interference condition, or the reception result, where determining the format parameter that indicates whether the PPDU is the ER PPDU is based on determining that the position satisfies the threshold. Condition manager 1225 may determine that a path loss of a communication link between receiver 1210 and transmitter 1220 satisfies a threshold based on the channel condition, the interference condition, or the reception result, where determining the format parameter that indicates whether the PPDU is the ER PPDU is based on determining that the path loss satisfies the threshold. Condition manager 1225 may determine that a signal strength of a communication link between receiver 1210 and transmitter 1220 satisfies a threshold based on the channel condition, the interference condition, or the reception result, where determining the format parameter that indicates whether the PPDU is the ER PPDU is based on determining that the signal strength satisfies the threshold.

Parameter manager 1230 may determine a format parameter for a PPDU based on the channel condition, the interference condition, or the reception result. In some cases, the format parameter indicates whether the PPDU is to include a mid-amble. In some cases, the format parameter indicates one or both of a guard interval of the PPDU or a HE-LTF size. In some cases, the format parameter indicates whether the PPDU is to be an extended range PPDU. In some cases, the format parameter is determined and the indication is transmitted autonomously, independent of receiving a request from the transmitter.

Indication manager 1235 may transmit an indication of the format parameter of the PPDU to the transmitter. In some cases, the indication includes a Doppler mode field that indicates whether the mid-amble may be included in the PPDU. In some cases, the indication includes a guard interval field that indicates a duration of the guard interval. In some cases, the indication includes a size field that indicates a symbol size of the HE-LTF.

Transmitter 1220 may transmit signals generated by other components of the device. In some examples, transmitter 1220 may be collocated with a receiver 1210 in a transceiver module. For example, transmitter 1220 may be an example of aspects of transceiver 1435 described below with reference to FIG. 14. Transmitter 1220 may utilize a single antenna or a set of antennas.

Figure 13:
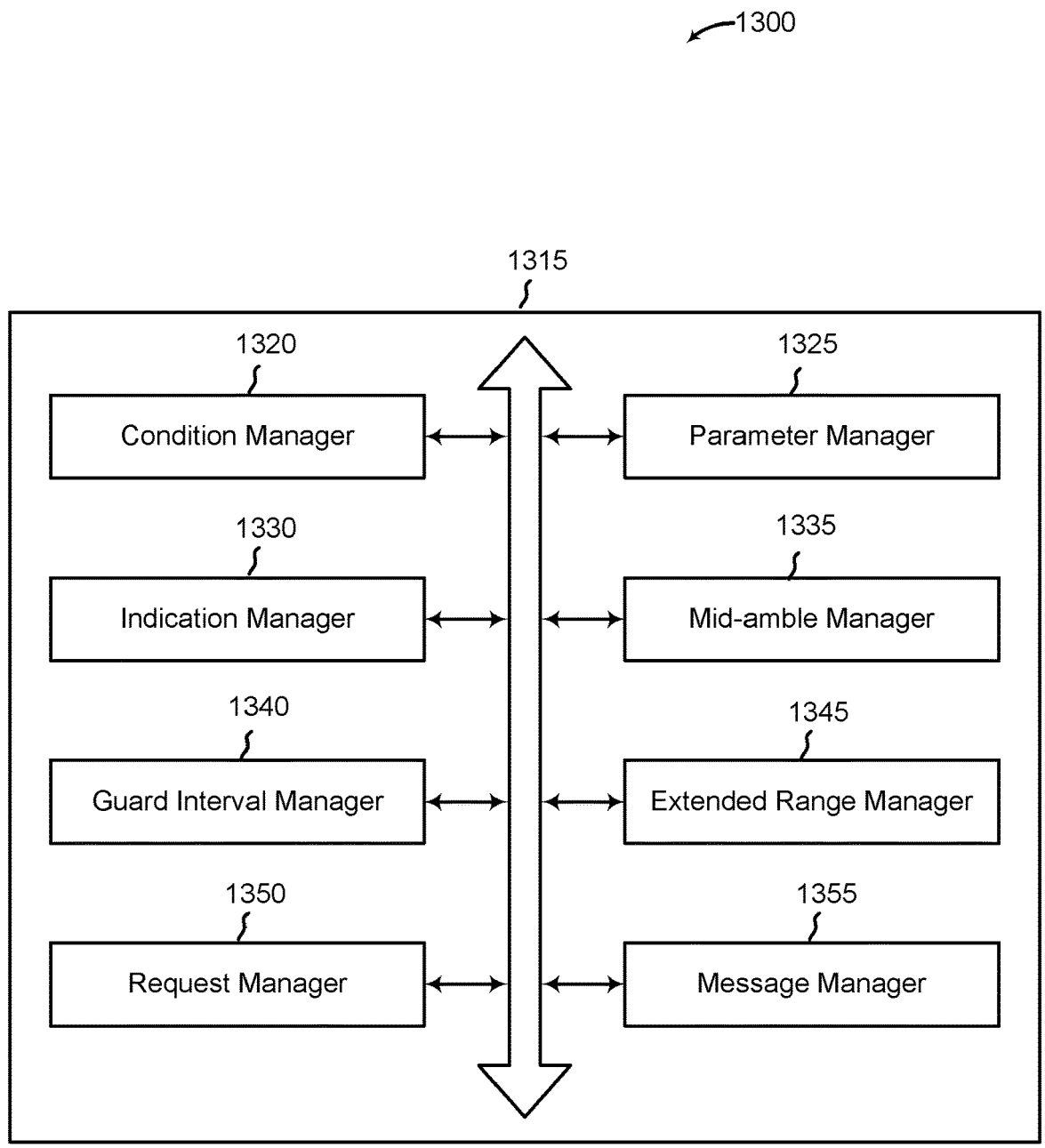
FIG. 13 shows a block diagram of a PPDU manager that supports techniques for selecting PPDU format parameters according to some implementations.

FIG. 13 shows a block diagram 1300 of a PPDU manager 1315 that supports techniques for selecting PPDU format parameters according to some implementations. PPDU manager 1315 may be an example of aspects of PPDU manager 1115, 1215, or 1415 described with reference to FIGS. 11, 12, and 14, respectively. PPDU manager 1315 may include condition manager 1320, parameter manager 1325, indication manager 1330, mid-amble manager 1335, GI manager 1340, extended range manager 1345, request manager 1350, and message manager 1355. Each of these modules may communicate, directly or indirectly, with one another (for example, via one or more buses).

Condition manager 1320 may determine a Doppler shift of a signal received from a transmitter. In some examples, condition manager 1320 may determine a delay spread of a signal received from a transmitter. In some examples, condition manager 1320 may identify a channel condition, an interference condition, or a reception result associated with the signal received from the transmitter, where determining the Doppler shift is based on the channel condition, the interference condition, or the reception result. In some examples, condition manager 1320 may identify a channel condition, an interference condition, or a reception result associated with the signal received from the transmitter, where determining the delay spread is based on the channel condition, the interference condition, or the reception result.

Parameter manager 1325 may determine a format parameter for a PPDU based on the Doppler shift of the signal. In some examples, the parameter manager 1325 may determine a format parameter for a PPDU based on the delay spread of the signal.

The indication manager 1330 may transmit an indication of the format parameter of the PPDU to the transmitter. In some examples, the indication manager 1330 may transmit an indication of the format parameter of the PPDU to the transmitter.

Condition manager 1320 may identify a channel condition, an interference condition, or a reception result associated with a signal received from a transmitter, determine a Doppler shift of the signal based on the channel condition, the interference condition, or the reception result. Condition manager 1320 may determine whether the Doppler shift satisfies a threshold, where determining the format parameter that indicates whether the PPDU is to include the mid-amble is based on determining that the Doppler shift satisfies the threshold. Condition manager 1320 may determine a delay spread of the signal based on the channel condition, the interference condition, or the reception result. Condition manager 1320 may determine whether the delay spread satisfies a threshold, where determining one or both of the guard interval or the HE-LTF size is based on determining that the delay spread satisfies the threshold. Condition manager 1320 may determine that a position of a receiver relative to the transmitter satisfies a threshold based on the channel condition, the interference condition, or the reception result, where determining the format parameter that indicates whether the PPDU is the ER PPDU is based on determining that the position satisfies the threshold. Condition manager 1320 may determine that a path loss of a communication link between a receiver and the transmitter satisfies a threshold based on the channel condition, the interference condition, or the reception result, where determining the format parameter that indicates whether the PPDU is the ER PPDU is based on determining that the path loss satisfies the threshold. Condition manager 1320 may determine that a signal strength of a communication link between a receiver and the transmitter satisfies a threshold based on the channel condition, the interference condition, or the reception result, where determining the format parameter that indicates whether the PPDU is the ER PPDU is based on determining that the signal strength satisfies the threshold.

Parameter manager 1325 may determine a format parameter for a PPDU based on the channel condition, the interference condition, or the reception result. In some cases, the format parameter indicates whether the PPDU is to include a mid-amble. In some cases, the format parameter indicates one or both of a guard interval of the PPDU or a HE-LTF size. In some cases, the format parameter indicates whether the PPDU is to be an extended range PPDU. In some cases, the format parameter is determined and the indication is transmitted autonomously, independent of receiving a request from the transmitter.

Indication manager 1330 may transmit an indication of the format parameter of the PPDU to the transmitter. In some cases, the indication includes a Doppler mode field that indicates whether the mid-amble may be included in the PPDU. In some cases, the indication includes a guard interval field that indicates a duration of the guard interval. In some cases, the indication includes a size field that indicates a symbol size of the HE-LTF.

Mid-amble manager 1335 may determine a mid-amble size based on the channel condition, the interference condition, or the reception result, where the indication includes a size field that indicates the mid-amble size. Mid-amble manager 1335 may determine an offset of the mid-amble from a beginning of a preamble of the PPDU based on the channel condition, the interference condition, or the reception result, where the indication includes an offset field that indicates the offset. Mid-amble manager 1335 may determine a mid-amble interval between a first mid-amble and a second mid-amble in the PPDU based on the channel condition, the interference condition, or the reception result, where the indication includes an interval field that indicates the mid-amble interval. Mid-amble manager 1335 may determine a format of the mid-amble based on the channel condition, the interference condition, or the reception result, where the indication includes a mid-amble format field indicating the format of the mid-amble. In some cases, the format of the mid-amble indicates whether the mid-amble includes a HE-STF, a HE-LTF, a size of the HE-LTF in the mid-amble, a guard interval duration, or a combination thereof. In some cases, the format parameter indicates that the PPDU is to include a second mid-amble different from the mid-amble, the second mid-amble being spaced apart from the mid-amble based on a mid-amble interval.

GI manager 1340 may determine a combined index that includes both the guard interval and the HE-LTF size, where the indication includes the combined index. GI manager 1340 may determine a PPDU format based on determining one or both of the guard interval or the HE-LTF size, where the indication includes a format field indicating the determined PPDU format.

Extended range manager 1345 may determine a bandwidth of the ER PPDU based on the channel condition, the interference condition, or the reception result, where the indication includes a bandwidth field that indicates the bandwidth. Extended range manager 1345 may determine that a decoding failure rate for high efficiency (HE) single user (SU) PPDUs received from the transmitter satisfies a threshold, where transmitting the indication that enables the ER PPDU is based on determining that the decoding failure rate satisfies the threshold. Extended range manager 1345 may determine that a decoding failure rate for a first bandwidth satisfies a threshold, where the indication indicates that a second bandwidth for the ER PPDU less than the first bandwidth based on determining that the decoding failure rate satisfies the threshold.

Request manager 1350 may receive a request from the transmitter to provide feedback to the transmitter about PPDU performance, where determining the format parameter is based on receiving the request.

Message manager 1355 may generate an HLA control message that includes the indication, where transmitting the indication includes transmitting the HLA control message. Message manager 1355 may generate a high efficiency (HE) SIG-A field that includes the indication, where transmitting the indication includes transmitting the HE-SIG-A field. In some cases, the PPDU is a HE PPDU, a HE SU PPDU, a HE extended range (ER) SU PPDU, a HE multi-user (MU) PPDU, or a HE trigger based (TB) PPDU.

Figure 14:
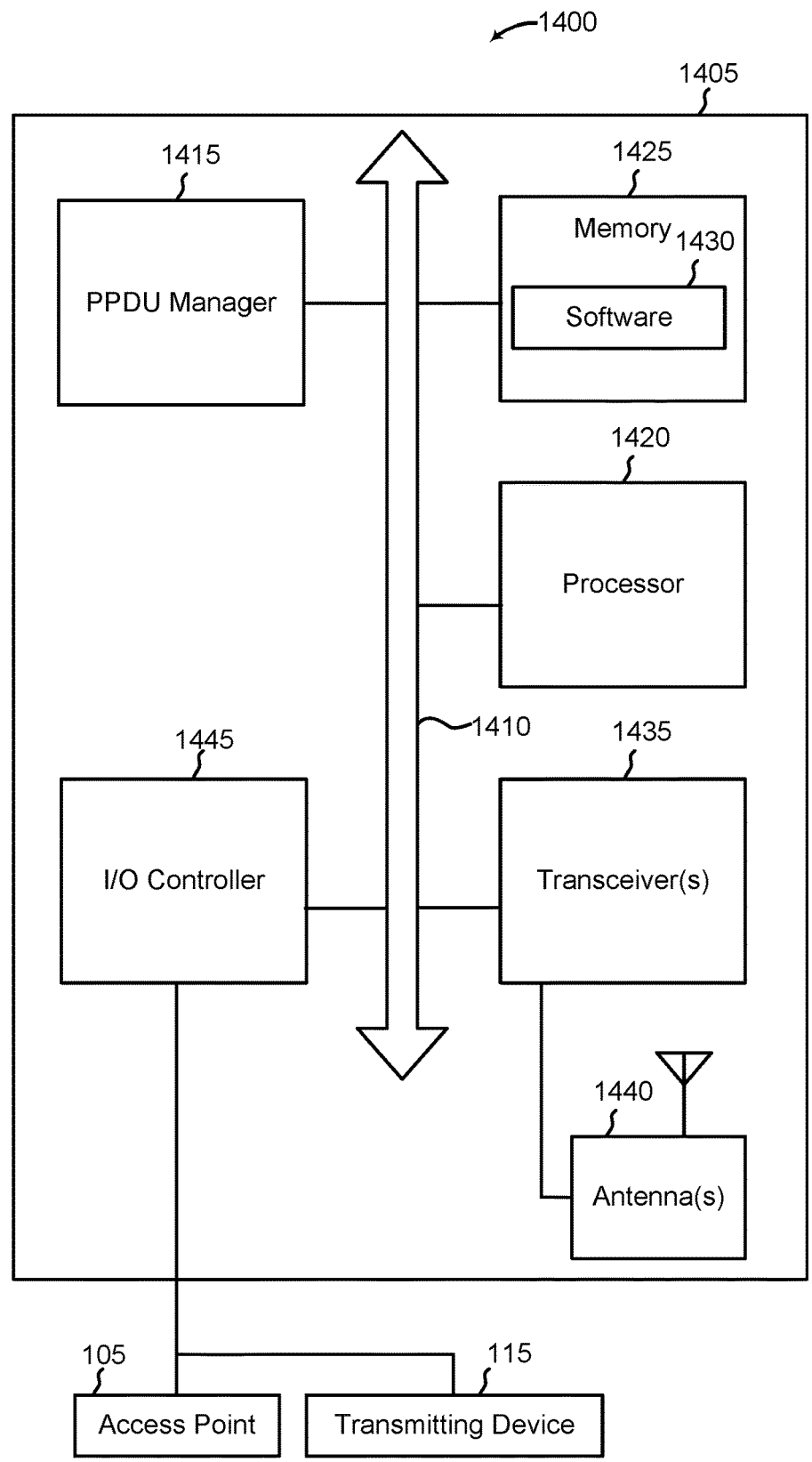
FIG. 14 shows a block diagram of a system including a wireless device that supports techniques for selecting PPDU format parameters according to some implementations.

FIG. 14 shows a block diagram 1400 of a system including a wireless device 1405 that supports techniques for selecting PPDU format parameters according to some implementations. Device 1405 may be an example of or include the components of wireless device 1105, wireless device 1205, or a receiving device 210 as described above, for example, with reference to FIGS. 11 and 12. Device 1405 may include components for bi-directional voice and data communications including components for transmitting and receiving communications, including PPDU manager 1415, processor 1420, memory 1425, software 1430, transceiver 1435, antenna 1440, and I/O controller 1445. These components may be in electronic communication via one or more buses (for example, bus 1410).

Processor 1420 may include an intelligent hardware device, (for example, a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (for example, functions or tasks supporting techniques for selecting PPDU format parameters).

Memory 1425 may include random access memory (RAM) and read only memory (ROM). Memory 1425 may store computer-readable, computer-executable software 1430 including instructions that, when executed, cause the processor to perform various functions described herein. In some cases, memory 1425 may contain, among other things, a basic input/output system (BIOS) which may control basic hardware or software operation such as the interaction with peripheral components or devices.

Software 1430 may include code to implement aspects of the present disclosure, including code to support techniques for selecting PPDU format parameters. Software 1430 may be stored in a non-transitory computer-readable medium such as system memory or other memory. In some cases, software 1430 may not be directly executable by the processor but may cause a computer (for example, when compiled and executed) to perform functions described herein.

Transceiver 1435 may communicate bi-directionally, via one or more antennas, wired, or wireless links as described above. For example, transceiver 1435 may represent a wireless transceiver and may communicate bi-directionally with another wireless transceiver. Transceiver 1435 may also include a modem to modulate the packets and provide the modulated packets to the antennas for transmission, and to demodulate packets received from the antennas.

In some cases, the wireless device 1405 may include a single antenna 1440. However, in some cases the device 1405 may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
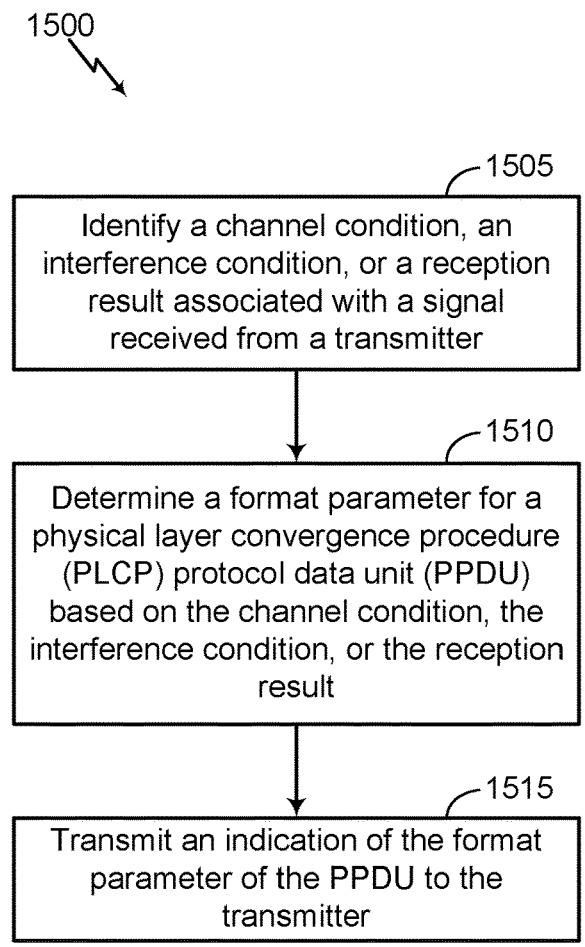
FIGS. 15 through 20 show flowcharts illustrating example methods for techniques for selecting PPDU format parameters according to some implementations.

FIG. 15 shows a flowchart illustrating an example method 1500 for techniques for selecting PPDU format parameters according to some implementations. The operations of method 1500 may be implemented by a receiving device 210 or its components as described herein. For example, the operations of method 1500 may be performed by a PPDU manager 1115, 1215, 1315, and 1415 as described with reference to FIGS. 11 through 14. In some examples, a receiving device 210 may execute a set of codes to control the functional elements of the device to perform the functions described below. Additionally or alternatively, the receiving device 210 may perform aspects of the functions described below using special-purpose hardware.

At block 1505, the receiving device 210 may identify a channel condition, an interference condition, or a reception result associated with a signal received from a transmitting device. The operations of block 1505 may be performed according to the methods described herein. In some examples, aspects of the operations of block 1505 may be performed by a condition manager as described with reference to FIGS. 11 through 14.

At block 1510, the receiving device 210 may determine a format parameter for a PPDU based at least in part on the channel condition, the interference condition, or the reception result. The operations of block 1510 may be performed according to the methods described herein. In some examples, aspects of the operations of block 1510 may be performed by a parameter manager as described with reference to FIGS. 11 through 14.

At block 1515, the receiving device 210 may transmit an indication of the format parameter of the PPDU to the transmitting device. The operations of block 1515 may be performed according to the methods described herein. In some examples, aspects of the operations of block 1515 may be performed by an indication manager as described with reference to FIGS. 11 through 14.

Figure 16:
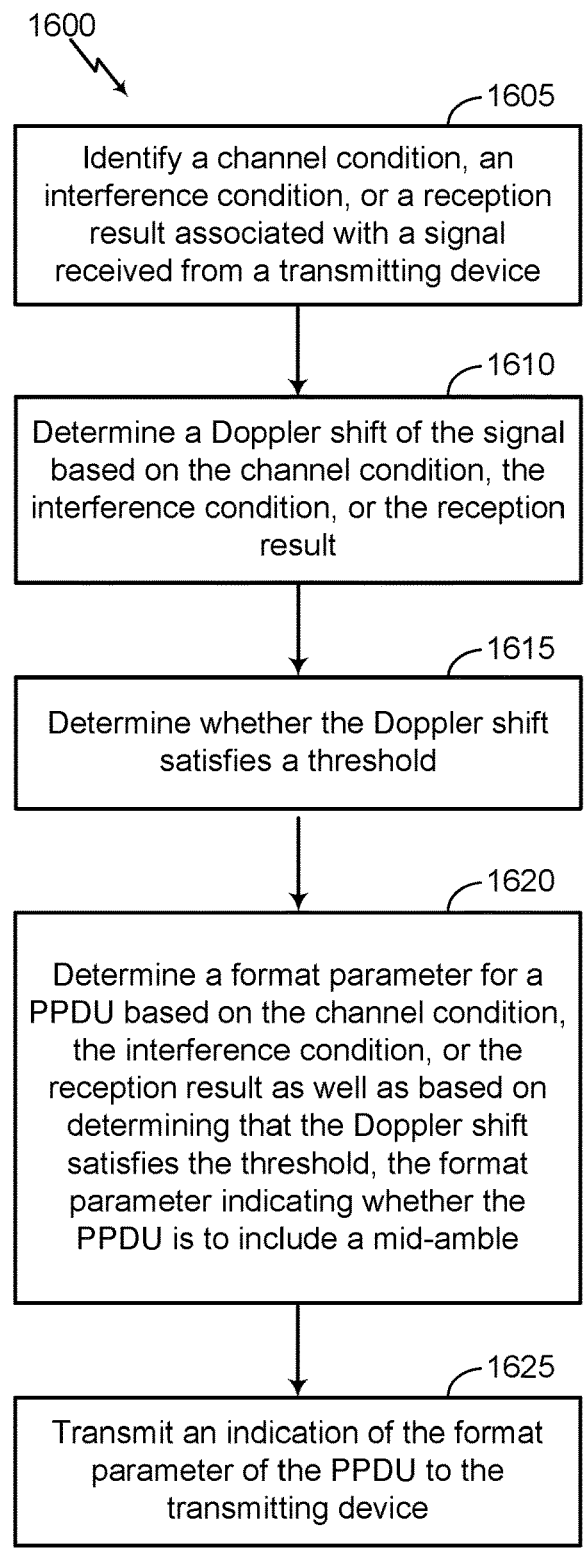

FIG. 16 shows a flowchart illustrating an example method 1600 for techniques for selecting PPDU format parameters according to some implementations. The operations of method 1600 may be implemented by a receiving device 210 or its components as described herein. For example, the operations of method 1600 may be performed by a PPDU manager 1115, 1215, 1315, and 1415 as described with reference to FIGS. 11 through 14. In some examples, a receiving device 210 may execute a set of codes to control the functional elements of the device to perform the functions described below. Additionally or alternatively, the receiving device 210 may perform aspects of the functions described below using special-purpose hardware.

At block 1605, the receiving device 210 may identify a channel condition, an interference condition, or a reception result associated with a signal received from a transmitting device. The operations of block 1605 may be performed according to the methods described herein. In some examples, aspects of the operations of block 1605 may be performed by a condition manager as described with reference to FIGS. 11 through 14.

At block 1610, the receiving device 210 may determine a Doppler shift of the signal based at least in part on the channel condition, the interference condition, or the reception result. The operations of block 1610 may be performed according to the methods described herein. In some examples, aspects of the operations of block 1610 may be performed by a condition manager as described with reference to FIGS. 11 through 14.

At block 1615, the receiving device 210 may determine whether the Doppler shift satisfies a threshold. The operations of block 1615 may be performed according to the methods described herein. In some examples, aspects of the operations of block 1615 may be performed by a condition manager as described with reference to FIGS. 11 through 14.

At block 1620, the receiving device 210 may determine a format parameter for a PPDU based at least in part on the channel condition, the interference condition, or the reception result as well as based on determining that the Doppler shift satisfies the threshold, the format parameter indicating whether the PPDU is to include a mid-amble. In some cases. In some implementations, the format parameter indicates whether the PPDU is to include a mid-amble. The operations of block 1620 may be performed according to the methods described herein. In some examples, aspects of the operations of block 1620 may be performed by a parameter manager as described with reference to FIGS. 11 through 14.

At block 1625, the receiving device 210 may transmit an indication of the format parameter of the PPDU to the transmitting device. The operations of block 1625 may be performed according to the methods described herein. In some examples, aspects of the operations of block 1625 may be performed by an indication manager as described with reference to FIGS. 11 through 14.

Figure 17:
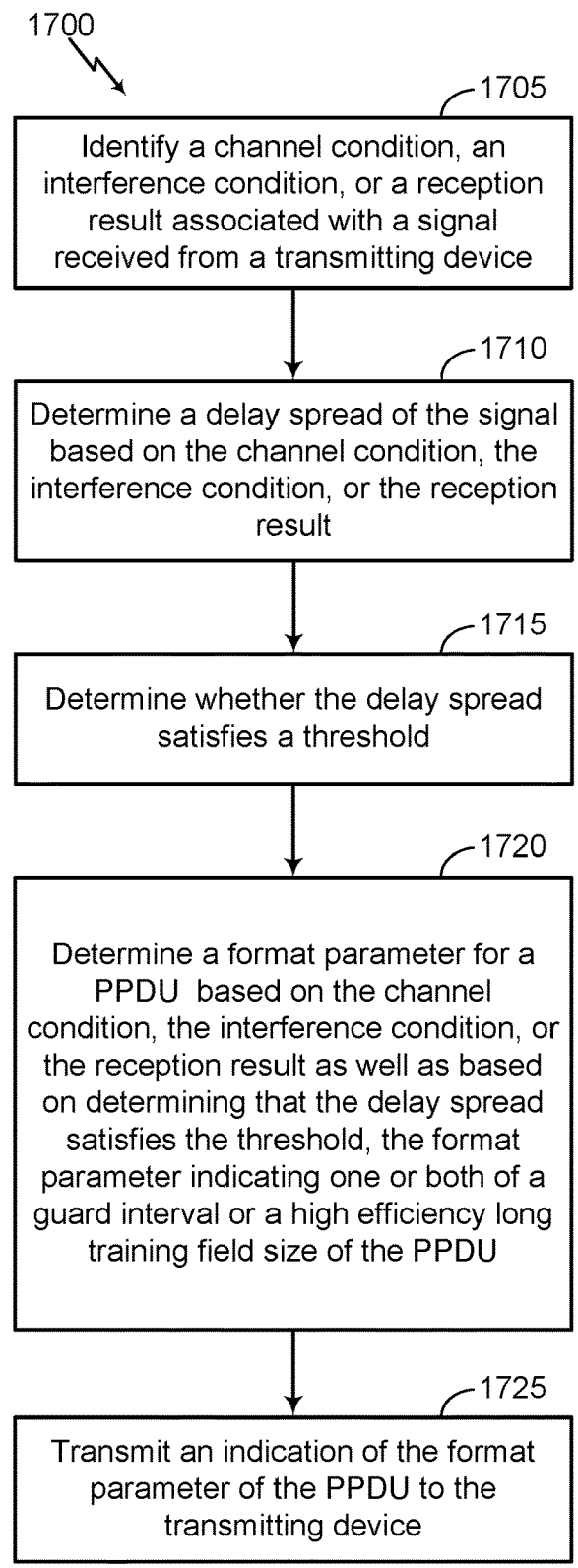

FIG. 17 shows a flowchart illustrating an example method 1700 for techniques for selecting PPDU format parameters according to some implementations. The operations of method 1700 may be implemented by a receiving device 210 or its components as described herein. For example, the operations of method 1700 may be performed by a PPDU manager as described with reference to FIGS. 11 through 14. In some examples, a receiving device 210 may execute a set of codes to control the functional elements of the device to perform the functions described below. Additionally or alternatively, the receiving device 210 may perform aspects of the functions described below using special-purpose hardware.

At block 1705, the receiving device 210 may identify a channel condition, an interference condition, or a reception result associated with a signal received from a transmitting device. The operations of block 1705 may be performed according to the methods described herein. In some examples, aspects of the operations of block 1705 may be performed by a condition manager as described with reference to FIGS. 11 through 14.

At block 1710, the receiving device 210 may determine a delay spread of the signal based at least in part on the channel condition, the interference condition, or the reception result. The operations of block 1710 may be performed according to the methods described herein. In some examples, aspects of the operations of block 1710 may be performed by a condition manager as described with reference to FIGS. 11 through 14.

At block 1715, the receiving device 210 may determine whether the delay spread satisfies a threshold. The operations of block 1715 may be performed according to the methods described herein. In some examples, aspects of the operations of block 1715 may be performed by a condition manager as described with reference to FIGS. 11 through 14.

At block 1720, the receiving device 210 may determine a format parameter for a PPDU based at least in part on the channel condition, the interference condition, or the reception result as well as based on determining that the delay spread satisfies the threshold. In some implementations, the format parameter indicates one or both of a guard interval or an HE-LTF size of the PPDU. The operations of block 1720 may be performed according to the methods described herein. In some examples, aspects of the operations of block 1720 may be performed by a parameter manager as described with reference to FIGS. 11 through 14.

At block 1725, the receiving device 210 may transmit an indication of the format parameter of the PPDU to the transmitting device. The operations of block 1725 may be performed according to the methods described herein. In some examples, aspects of the operations of block 1725 may be performed by an indication manager as described with reference to FIGS. 11 through 14.

Figure 18:
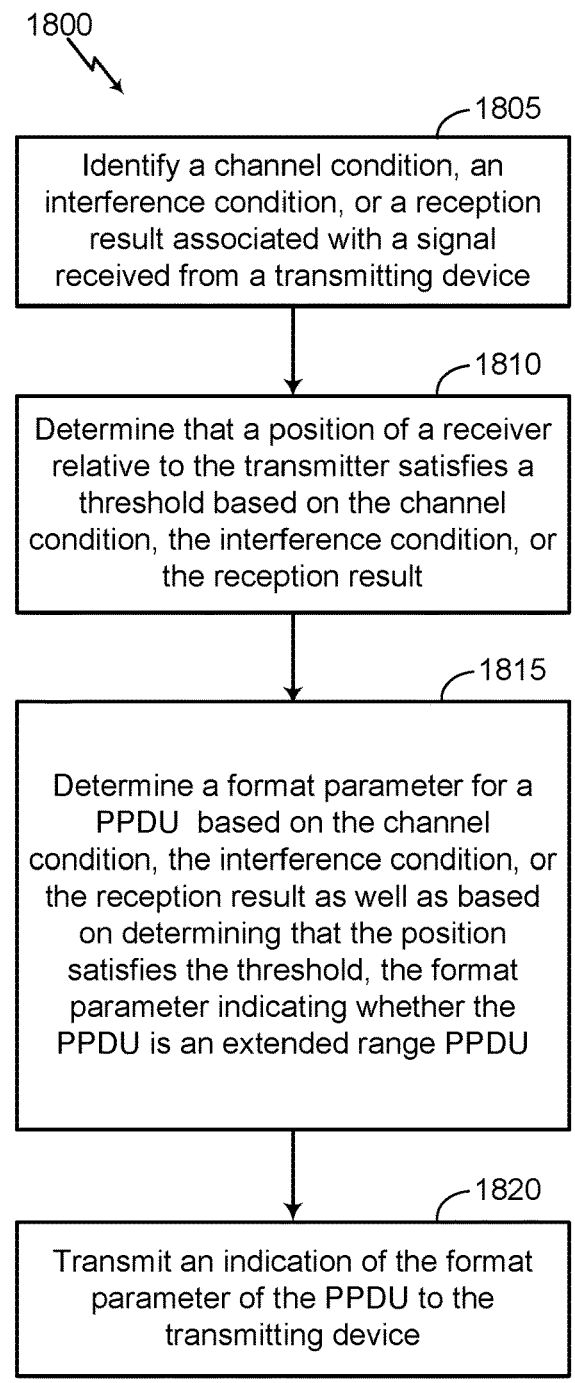

FIG. 18 shows a flowchart illustrating an example method 1800 for techniques for selecting PPDU format parameters according to some implementations. The operations of method 1800 may be implemented by a receiving device 210 or its components as described herein. For example, the operations of method 1800 may be performed by a PPDU manager 1115, 1215, 1315, and 1415 as described with reference to FIGS. 11 through 14. In some examples, a receiving device 210 may execute a set of codes to control the functional elements of the device to perform the functions described below. Additionally or alternatively, the receiving device 210 may perform aspects of the functions described below using special-purpose hardware.

At block 1805, the receiving device 210 may identify a channel condition, an interference condition, or a reception result associated with a signal received from a transmitting device. The operations of block 1805 may be performed according to the methods described herein. In some examples, aspects of the operations of block 1805 may be performed by a condition manager as described with reference to FIGS. 11 through 14.

At block 1810, the receiving device 210 may determine that a position of a receiver relative to the transmitter satisfies a threshold based at least in part on the channel condition, the interference condition, or the reception result. The operations of block 1810 may be performed according to the methods described herein. In some examples, aspects of the operations of block 1810 may be performed by a condition manager as described with reference to FIGS. 11 through 14.

At block 1815, the receiving device 210 may determine a format parameter for a PPDU based at least in part on the channel condition, the interference condition, or the reception result as well as based on determining that the position satisfies the threshold. In some implementations, the format parameter indicates whether the PPDU is an extended range PPDU. The operations of block 1815 may be performed according to the methods described herein. In some examples, aspects of the operations of block 1815 may be performed by a parameter manager as described with reference to FIGS. 11 through 14.

At block 1820, the receiving device 210 may transmit an indication of the format parameter of the PPDU to the transmitting device. The operations of block 1820 may be performed according to the methods described herein. In some examples, aspects of the operations of block 1820 may be performed by an indication manager as described with reference to FIGS. 11 through 14.

Figure 19:
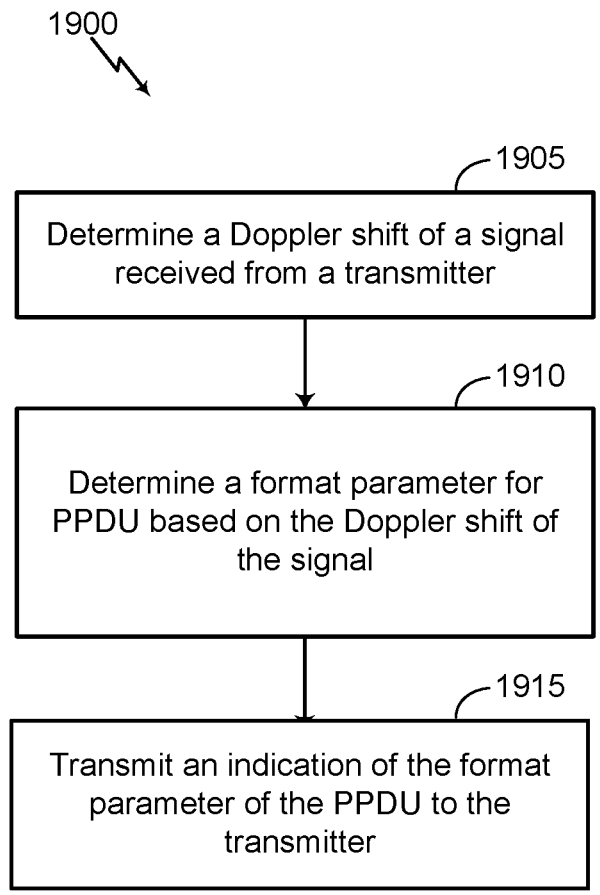

FIG. 19 shows a flowchart illustrating an example method 1900 for techniques for selecting PPDU format parameters according to some implementations. The operations of method 1900 may be implemented by a receiving device 210 or its components as described herein. For example, the operations of method 1900 may be performed by PPDU manager 1115, 1215, 1315, and 1415 as described with reference to FIGS. 11 through 14. In some examples, the receiving device 210 may execute a set of instructions to control the functional elements of the receiving device 210 to perform the functions described below. Additionally or alternatively, the receiving device 210 may perform aspects of the functions described below using special-purpose hardware.

At 1905, the receiving device 210 may determine a Doppler shift of a signal received from a transmitter. The operations of 1905 may be performed according to the methods described herein. In some examples, aspects of the operations of 1905 may be performed by a condition manager as described with reference to FIGS. 11 through 14.

At 1910, the receiving device 210 may determine a format parameter for a PPDU based on the Doppler shift of the signal. The operations of 1910 may be performed according to the methods described herein. In some examples, aspects of the operations of 1910 may be performed by a parameter manager as described with reference to FIGS. 11 through 14.

At 1915, the receiving device 210 may transmit an indication of the format parameter of the PPDU to the transmitter. The operations of 1915 may be performed according to the methods described herein. In some examples, aspects of the operations of 1915 may be performed by an indication manager as described with reference to FIGS. 11 through 14.

Figure 20:
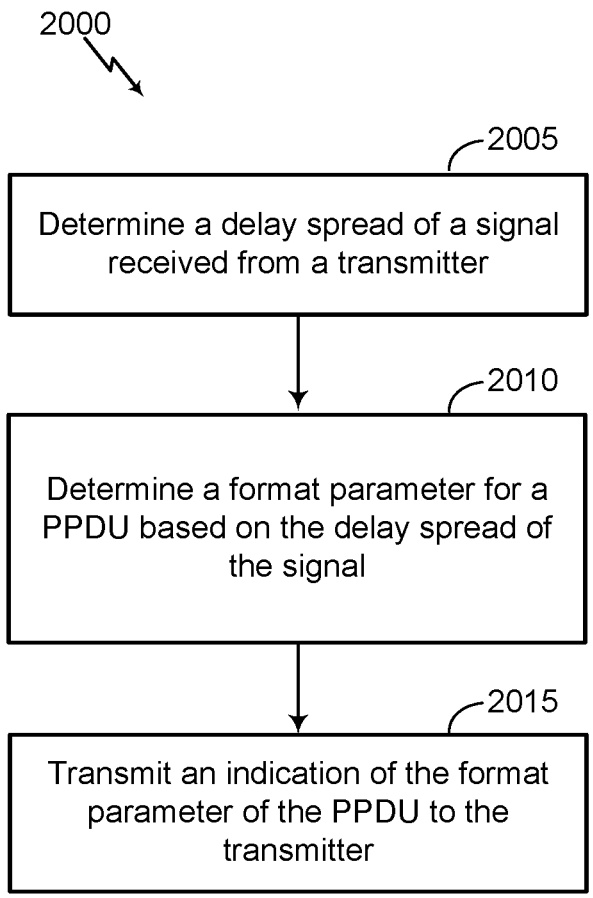

FIG. 20 shows a flowchart illustrating an example method 2000 for techniques for selecting PPDU format parameters according to some implementations. The operations of method 2000 may be implemented by a receiving device 210 or its components as described herein. For example, the operations of method 2000 may be performed by a PPDU manager as described with reference to FIGS. 11 through 14. In some examples, a receiving device 210 may execute a set of instructions to control the functional elements of the receiving device 210 to perform the functions described below. Additionally or alternatively, the receiving device 210 may perform aspects of the functions described below using special-purpose hardware.

At 2005, the receiving device 210 may determine a delay spread of a signal received from a transmitter. The operations of 2005 may be performed according to the methods described herein. In some examples, aspects of the operations of 2005 may be performed by a condition manager as described with reference to FIGS. 11 through 14.

At 2010, the receiving device 210 may determine a format parameter for a PPDU based on the delay spread of the signal. The operations of 2010 may be performed according to the methods described herein. In some examples, aspects of the operations of 2010 may be performed by a parameter manager as described with reference to FIGS. 11 through 14.

At 2015, the receiving device 210 may transmit an indication of the format parameter of the PPDU to the transmitter. The operations of 2015 may be performed according to the methods described herein. In some examples, aspects of the operations of 2015 may be performed by an indication manager as described with reference to FIGS. 11 through 14.

The methods described above describe possible implementations, and that the operations and the steps may be rearranged or otherwise modified and that other implementations are possible. Furthermore, aspects from two or more of the methods may be combined.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system The hardware and data processing apparatus used to implement the various illustrative components, logics, logical blocks, modules and circuits described in connection with the aspects disclosed herein may be implemented or performed with a general purpose single- or multi-chip processor, a DSP, an ASIC, a FPGA or other PLD, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above may also be included within the scope of storage media Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), or the like. CDMA2000 covers IS-2000, IS-95, and IS-856 standards. IS-2000 Releases may be commonly referred to as CDMA2000 1x, 1x, or the like. IS-856 (TIA-856) is commonly referred to as CDMA2000 1xEV-DO, High Rate Packet Data (HRPD), or the like. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, or the like.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication systems 100 and 200 of FIGS. 1 and 2—may include one or more carriers, where each carrier may be a signal made up of multiple sub-carriers (for example, waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless station or a first wireless access point, comprising:
   receiving, from a second wireless station or a second wireless access point, a signal having a delay spread; and
   transmitting, to the second wireless station or the second wireless access point, an indication of a format configuration for a physical layer protocol data unit to be transmitted to the second wireless station or the second wireless access point, the format configuration including a plurality of format parameters that are in accordance with the delay spread and associated with a non-legacy long training field (LTF) size for a non-legacy LTF symbol in a preamble of the physical layer protocol data unit.

2. The method of claim 1, further comprising identifying a channel condition, an interference condition, or a reception result associated with the signal received from the second wireless station or the second wireless access point, wherein the delay spread is determined in association with identifying the channel condition, the interference condition, or the reception result.

3. The method of claim 1, wherein the plurality of format parameters are further associated with a guard interval of the physical layer protocol data unit.

4. The method of claim 3, further comprising determining whether the delay spread satisfies a threshold, wherein one or both of the guard interval or the non-legacy LTF size is determined in association with determining that the delay spread satisfies the threshold.

5. The method of claim 3, wherein the indication includes a guard interval field that indicates a duration of the guard interval.

6. The method of claim 3, wherein the indication includes a size field that indicates a symbol size of an HE-LTF.

7. The method of claim 3, further comprising determining a combined index that includes both the guard interval and the non-legacy LTF size, wherein the indication includes the combined index.

8. The method of claim 3, further comprising determining a physical layer protocol data unit format in accordance with determining one or both of the guard interval or the non-legacy LTF size, wherein the indication includes a format field indicating the determined physical layer protocol data unit format.

9. The method of claim 1, wherein a format parameter of the plurality of format parameters of the physical layer protocol data unit indicates whether a first mid-amble includes a high efficiency short training field (HE-STF), a high efficiency long training field (HE-LTF), a size of the HE-LTF in the first mid-amble, a guard interval duration, or a combination thereof.

10. The method of claim 9, wherein the format parameter indicates that the physical layer protocol data unit is to include the first mid-amble, a second mid-amble different from the first mid-amble, the second mid-amble being spaced apart from the first mid-amble associated with a mid-amble interval.

11. A first wireless station or a first wireless access point for wireless communication, comprising:
    a processing system that includes processor circuitry and memory circuitry that stores code and is coupled with the processor circuitry, the processing system configured to cause the first wireless station or the first wireless access point to:
       receive, from a second wireless station or a second wireless access point, a signal having a delay spread; and
       transmit, to the second wireless station or the second wireless access point, an indication of a format configuration for a physical layer protocol data unit to be transmitted to the second wireless station or the second wireless access point, the format configuration including a plurality of format parameters that are in accordance with the delay spread and associated with a non-legacy long training field (LTF) size for a non-legacy LTF symbol in a preamble of the physical layer protocol data unit.

12. The first wireless station or the first wireless access point of claim 11, wherein the processing system is further configured to cause the first wireless station or the first wireless access point to identify a channel condition, an interference condition, or a reception result associated with the signal received from the second wireless station or the second wireless access point, wherein the delay spread is determined in association with identifying the channel condition, the interference condition, or the reception result.

13. The first wireless station or the first wireless access point of claim 11, wherein the plurality of format parameters are further associated with a guard interval of the physical layer protocol data unit.

14. The first wireless station or the first wireless access point of claim 13, wherein the processing system is further configured to cause the first wireless station or the first wireless access point to determine whether the delay spread satisfies a threshold, wherein one or both of the guard interval or the non-legacy LTF size is determined in association with determining that the delay spread satisfies the threshold.

15. The first wireless station or the first wireless access point of claim 13, wherein the indication includes a guard interval field that indicates a duration of the guard interval.

16. The first wireless station or the first wireless access point of claim 13, wherein the indication includes a size field that indicates a symbol size of an HE-LTF.

17. The first wireless station or the first wireless access point of claim 13, wherein the processing system is further configured to cause the first wireless station or the first wireless access point to determine a combined index that includes both the guard interval and the non-legacy LTF size, wherein the indication includes the combined index.

18. The first wireless station or the first wireless access point of claim 13, wherein the processing system is further configured to cause the first wireless station or the first wireless access point to determine a physical layer protocol data unit format in accordance with determining one or both of the guard interval or the non-legacy LTF size, wherein the indication include a format field indicating the determined physical layer protocol data unit format.

19. The first wireless station or the first wireless access point of claim 11, wherein a format parameter of the plurality of format parameters of the physical layer protocol data unit indicates whether a first mid-amble includes a high efficiency short training field (HE-STF), a high efficiency long training field (HE-LTF), a size of the HE-LTF in the first mid-amble, a guard interval duration, or a combination thereof.

20. The first wireless station or the first wireless access point of claim 19, wherein the format parameter indicates that the physical layer protocol data unit is to include the first mid-amble, a second mid-amble different from the first mid-amble, the second mid-amble being spaced apart from the first mid-amble associated with a mid-amble interval.

\* \* \* \* \*